United States Patent
Vardi et al.

(10) Patent No.: US 11,039,577 B2
(45) Date of Patent: Jun. 22, 2021

(54) FULL SPECTRUM LED GROW LIGHT SYSTEM

(71) Applicant: SK LED, LLC, Greenwood Village, CO (US)

(72) Inventors: Rami Vardi, Woodland Hills, CA (US); Brendan Strath, Canoga Park, CA (US); Or Vardi, North Hollywood, CA (US)

(73) Assignee: SK LED, LLC, Greenwood Village, CO (US)

(*) Notice: Subject to any disclaimer, the term of this patent is extended or adjusted under 35 U.S.C. 154(b) by 0 days.

(21) Appl. No.: 17/157,873

(22) Filed: Jan. 25, 2021

(65) Prior Publication Data

US 2021/0137023 A1 May 13, 2021

Related U.S. Application Data

(63) Continuation of application No. 16/362,553, filed on Mar. 22, 2019, now Pat. No. 10,897,852, which is a continuation of application No. 15/908,546, filed on Feb. 28, 2018, now Pat. No. 10,238,043.

(51) Int. Cl.
*A01G 7/04* (2006.01)
*F21S 4/00* (2016.01)
(Continued)

(52) U.S. Cl.
CPC .............. *A01G 7/045* (2013.01); *F21S 4/00* (2013.01); *F21V 23/003* (2013.01); *F21V 29/71* (2015.01);
(Continued)

(58) Field of Classification Search
CPC ........ A01G 7/045; H05B 45/20; F21V 29/71; F21V 29/74; F21V 29/83; F21V 31/005;
(Continued)

(56) References Cited

U.S. PATENT DOCUMENTS 7,988,327 B1 * 8/2011 Knoble ................. H05B 45/00
362/235
9,857,068 B2 * 1/2018 Nguyen ................ F21V 15/015
(Continued)

OTHER PUBLICATIONS

Spectrum King, What's Different about Spectrum King LED Grow Lights?, Nov. 21, 2014, retrieved from the internet on Jan. 12, 2021, https://web.archive.org/web/20141121130605/http://spectrumkingled.com/whats-different-about-spectrum-king-led-grow-lights/.
(Continued)

*Primary Examiner* — Alan B Cariaso
(74) *Attorney, Agent, or Firm* — Lowry Blixseth APC; Scott M. Lowry

(57) ABSTRACT

The LED grow light system includes at least one of a first LED that includes a 4,000K LED having a first light output, at least one of a second LED having a second light output in about an orange spectra, at least one of a third LED having a third light output in about a green/yellow spectra, and at least one of a fourth LED having a fourth light output in about a red spectra. Each of the first light output, the second light output, the third light output, and the fourth light output combine into an aggregate light output that mimics a full spectrum of sunlight at a relatively efficient input power of about 600-650 watts.

30 Claims, 14 Drawing Sheets

(51) Int. Cl.

| | |
|---|---|
| *F21V 23/00* | (2015.01) |
| *F21V 29/71* | (2015.01) |
| *H05B 45/20* | (2020.01) |
| *F21V 29/74* | (2015.01) |
| *F21Y 105/16* | (2016.01) |
| *F21V 31/00* | (2006.01) |
| *F21Y 115/10* | (2016.01) |
| *F21Y 113/13* | (2016.01) |
| *F21V 29/83* | (2015.01) |

(52) U.S. Cl.
CPC .............. *H05B 45/20* (2020.01); *F21V 29/74* (2015.01); *F21V 29/83* (2015.01); *F21V 31/005* (2013.01); *F21Y 2105/16* (2016.08); *F21Y 2113/13* (2016.08); *F21Y 2115/10* (2016.08)

(58) Field of Classification Search
CPC .... F21V 23/003; F21V 23/004; F21V 23/005; F21V 23/006; F21S 4/00; F21Y 2105/16; F21Y 2113/10; F21Y 2113/13
See application file for complete search history.

(56) References Cited

U.S. PATENT DOCUMENTS

| | | | | |
|---|---|---|---|---|
| 10,238,043 B1 * | 3/2019 | Vardi | ...................... | F21V 29/71 |
| 10,897,852 B2 * | 1/2021 | Vardi | ...................... | F21V 29/71 |
| 2008/0212319 A1 * | 9/2008 | Klipstein | ................. | B60Q 3/35 |
| | | | | 362/231 |
| 2010/0020536 A1 * | 1/2010 | Bafetti | ................... | A01G 7/045 |
| | | | | 362/231 |
| 2016/0178179 A1 * | 6/2016 | Hanson | ................... | A01G 7/045 |
| | | | | 362/249.02 |
| 2016/0193478 A1 * | 7/2016 | Maxik | .................... | H05B 45/20 |
| | | | | 362/231 |
| 2017/0045201 A1 * | 2/2017 | Jones | ........................ | F21V 7/30 |
| 2018/0042186 A1 * | 2/2018 | Kop | ........................ | A01H 1/027 |
| 2018/0058674 A1 * | 3/2018 | Reynolds | .................. | F21S 4/22 |

OTHER PUBLICATIONS

Spectrum King, Our Grow Lights, Nov. 21, 2014, retrieved from the internet on Jan. 12, 2021, https://web.archive.org/web/20141121214635/http://spectrumkingled.com/our-grow-lights/.

Spectrum King, What's Different about Spectrum King LED Grow Lights?, Mar. 3, 2016, retrieved from the internet on Jan. 12, 2021, https://web.archive.org/web/20160303213224/http://spectrumkingled.com/whats-different-about-spectrum-king-led-grow-lights/.

Spectrum King, Mar. 6, 2016, retrieved from the internet on Jan. 12, 2021, https://web.archive.org/web/20160306041941/http://spectrumkingled.com/.

Spectrum King, Our Grow Lights, Nov. 15, 2017, retrieved from the internet on Jan. 12, 2021, https://web.archive.org/web/20171115045517/http://spectrumkingled.com/our-grow-lights/.

Spectrum King, See for Yourself!, Advertisement, 2014.

Spectrum King, T.E.M.P.O., Advertisement, 2015.

* cited by examiner

| nm | mW | nm | mW | nm | mW | nm | mW | nm | mW |
|---|---|---|---|---|---|---|---|---|---|
| 390 | 1.47E+01 | 465 | 6.74E+02 | 540 | 9.83E+02 | 615 | 1.21E+03 | 690 | 2.71E+02 |
| 395 | 1.61E+01 | 470 | 5.46E+02 | 545 | 1.01E+03 | 620 | 1.17E+03 | 695 | 2.58E+02 |
| 400 | 1.76E+01 | 475 | 4.27E+02 | 550 | 1.04E+03 | 625 | 1.13E+03 | 700 | 2.04E+02 |
| 405 | 2.26E+01 | 480 | 3.76E+02 | 555 | 1.07E+03 | 630 | 1.09E+03 | 705 | 1.76E+02 |
| 410 | 3.66E+01 | 485 | 3.79E+02 | 560 | 1.10E+03 | 635 | 1.06E+03 | 710 | 1.52E+02 |
| 415 | 5.75E+01 | 490 | 4.10E+02 | 565 | 1.14E+03 | 640 | 1.00E+03 | 715 | 1.35E+02 |
| 420 | 9.21E+01 | 495 | 4.67E+02 | 570 | 1.17E+03 | 645 | 8.81E+02 | 720 | 1.15E+02 |
| 425 | 1.55E+02 | 500 | 5.47E+02 | 575 | 1.20E+03 | 650 | 7.70E+02 | 725 | 9.79E+01 |
| 430 | 2.45E+02 | 505 | 6.29E+02 | 580 | 1.23E+03 | 655 | 6.90E+02 | 730 | 8.65E+01 |
| 435 | 3.69E+02 | 510 | 7.04E+02 | 585 | 1.26E+03 | 660 | 6.26E+02 | 735 | 7.32E+01 |
| 440 | 5.38E+02 | 515 | 7.72E+02 | 590 | 1.28E+03 | 665 | 5.65E+02 | 740 | 6.65E+01 |
| 445 | 8.13E+02 | 520 | 8.30E+02 | 595 | 1.29E+03 | 670 | 4.92E+02 | 745 | 5.62E+01 |
| 450 | 1.16E+03 | 525 | 8.76E+02 | 600 | 1.30E+03 | 675 | 4.17E+02 | 750 | 4.78E+01 |
| 455 | 1.18E+03 | 530 | 9.16E+02 | 605 | 1.29E+03 | 680 | 3.61E+02 | 755 | 4.62E+01 |
| 460 | 8.74E+02 | 535 | 9.49E+02 | 610 | 1.25E+03 | 685 | 3.12E+02 | 760 | 3.75E+01 |

*FIG. 15*

FULL SPECTRUM LED GROW LIGHT SYSTEM

BACKGROUND OF THE INVENTION

The present invention generally relates to an LED grow light system. More specifically, the present invention relates to a full spectrum LED grow light system for producing a light output spectrum comparable to the sun at a relatively efficient and low power input.

The sun provides the vast majority of energy required for photosynthesis in plant growth on Earth. That being said, the sun is still not necessarily the most efficient light source for growing particular types of plants at least in part because the energy emitted by the sun cannot be readily controlled and/or regulated based on plant specific grow cycles, i.e., the light energy wavelengths emitted from the sun cannot be fine-tuned to optimize plant growth characteristics. As an example, FIG. 1 is a sun light spectrum graph 20 illustrating the spectra of light output from the sun at various wavelengths and intensities under various conditions during the day. More specifically, the vertical scale illustrates the relative light output intensity from the sun at various wavelengths and under different meteorological conditions as identified in the graph 20. Direct sunlight during blue sky conditions (i.e., no overcasts) has the highest intensity, at least generally for wavelengths in about the 350-475 nanometer ("nm") range. While the light output from the sun includes a relatively broad spectrum of wavelengths having a relative spectral power output fairly consistently high as illustrated in FIG. 1, it is known that plants typically do not actually use the entire spectrum of sunlight emitted by the sun and that specific wavelengths/intensities may be more desirable than others. Thus, simply replicating the spectral power intensities of the sun, as shown in FIG. 1, in a grow light system is energy inefficient.

In the last several decades, High Pressure Sodium ("HPS") lamps have been used extensively as plant grow lights for indoor and outdoor plant growing systems to replace or supplement natural sunlight. In this respect, HPS lamps are proven to be some of the best available artificial lighting systems for plant growth because of the relatively high output intensity within certain visible light spectrums. Moreover, HPS lamps have a relatively low price, relatively short life, relatively high photo-synthetically active radiation ("PAR") emission, and a relatively high electrical efficiency. Although, one drawback is that HPS lamps are not necessarily optimal for promoting photosynthesis and photomorphogenesis since HPS lamps have limited spectral light output intensities at certain wavelengths. For example, FIG. 2 is an HPS light spectrum graph 22 illustrating the relative intensities of visible light emitted from an HPS lamp. As shown, the HPS lamp has an energy intensity strongest around the orange-red part of the spectrum, i.e., at wavelengths of about 560-620 nm, with a peak 24 near the 600 nm wavelength. Such strong light intensities in this range tend to stimulate plant hormones to start budding and flowering, but do not necessarily promote desired growth. Thus, one disadvantage is that continued exposure to such high intensities in the orange-red part of the spectrum (i.e., wavelengths of about 580-620 nm) can result in excessive leaf and stem elongation due to the unbalanced spectral emission intensity from the HPS lamp in this range, and especially relative to other absorption peaks of the plant. Thus, while HPS lamps have been widely used, plant growth under HPS lamps may be less than optimal. Even so, given the past success of HPS lamps operating as plant grow lights, it may still be desirable to somewhat replicate the HPS lamp light output spectrum in more energy efficient systems, such as LEDs.

In recent years, LED lighting technology has matured within the lighting industry such that advancements in LED architecture have resulted in significantly reducing manufacturing costs, increasing LED efficiency, and creating an overall more robust LED light design better suited for use in plant grow light systems. In this respect, it may now be feasible to replace HPS lamp-based plant grow light systems with LED-based plant grow light systems in the horticulture business to lower the Total Cost of Ownership ("TCO"), such as lowering the cost of electricity (i.e., LEDs tend to be more energy efficient than HPS lamps), lowering the cost of air conditioning (i.e., LEDs tend to generate less heat and require less cooling to maintain adequate operating temperatures relative to HPS lamps), lowering the cost of the lamps themselves, and increasing lamp longevity (i.e., decreasing the replacement rate in view that LEDs have a longer projected lifespan). Although, one major drawback of using LEDs as a plant grow light is that the spectrum of the LED output is different than the output of sunlight and different than most acceptable artificial HPS lamps used for plant grow light applications. For example, LED grow light designs manufactured specifically for the horticulture market use blue LEDs (e.g., at wavelengths of about 420-480 nm) and red LEDs (e.g., at wavelengths of about 620-780 nm). To this end, the green spectrum (e.g., at wavelengths of about 500-580 nm) is commonly omitted from LED plant grow lights since the belief within the industry is that green light is reflected by the chlorophyll in the leaves and thus not absorbed by the plant. Thus, important aspects of robust plant growth are lost since wavelengths between the blue spectrum and red spectrum (e.g., within the green or yellow spectrums) are disregarded and commonly omitted from LED grow lights. HPS lamps, on the other hand, have relatively stronger (yet not optimal) green spectrum intensities in the 500-580 nm wavelength range as shown, e.g., in FIG. 2. Although, HPS lamps are more expensive and have a relatively shorter life when compared to LED lights, and HPS lamps are also not necessarily environmentally friendly because they contain mercury, and, importantly, the spectrum of the HPS lamp cannot be tailored to meet the various spectral needs of different plants.

One benefit of an LED grow light is that there are a wide number of available LEDs that generate light output at custom wavelengths. Although, mimicking the sun or an HPS lamp in an LED grow light is not as simple as aggregating several differently colored industry standard LEDs having different light output wavelengths because the resultant spectrum is not exactly similar to that of the sun light spectrum graph illustrated with respect to FIG. 1 or the HPS lamp light spectrum graph 22 illustrated with respect to FIG. 2. For example, FIG. 3 is a tri-LED light spectrum graph 26 illustrating the relative radiant power of three off-the-shelf LEDs having different color temperatures ("CCT") and different color rendering indices ("CRI"). As shown, even the lowest 2,200K CCT LED does not have a spectrum that matches the HPS lamp light spectrum graph 22 as closely in intensity in the blue spectrum (e.g., at wavelengths of about 420-480 nm)—the relative radiant power intensity is too high. It becomes necessary to either increase the amount of the orange/red light (e.g., at wavelengths of about 580-620 nm) to compensate for the relatively high intensity in the blue spectrum; or decrease the amount of blue light so the LED light output is similar to that of the HPS lamp. Continuing to lower the CCT of the LED further lowers the amount of blue light, but at a penalty in lowering the efficiency of the LED. Thus, current LEDs known in the art are ineffective in grow light applications, especially when compared to HPS lamps.

In another example, FIG. 4 illustrates an octo-LED light spectrum graph 28 illustrating the relative radiant power of eight standard off-the-shelf LEDs made with different phosphor materials, each with a different center light output wavelength such that the output spectrum can be tailored to the desired wavelength. Various combinations of such phosphor materials may provide for different color outputs based on the compositions of the phosphors. Here, to add more of the orange/red spectrum to the LED lighting system, additional LEDs that emit output light in more of the amber, orange/red, and/or red spectrum may be added to help better mimic the spectrum of that of the HPS lamp. This is accomplished chiefly by increasing the output intensity of the LEDs having the orange/red wavelengths, such as relative to the blue spectrum light output. Even so, each of the LEDs produces sharp peaks uncharacteristic of the sun light spectrum graph 20 or the HPS lamp light spectrum graph 22, thus producing less than optimal plant growth results. As a result, LED grow lights tailored to have peak output wavelengths in the same or similar region as an HPS lamp may tend to be more efficient and effective in applications for growing plants, unlike the aggregation illustrated in FIG. 4, especially when combined with light output having intensities at other wavelengths along the spectrum (e.g., at wavelengths of about 380-780 nm) similar to the sunlight spectrum graph 20 and/or the HPS lamp light spectrum graph 22. Such LED grow lights may provide advantages over the sun and well-proven HPS lamps, as discussed in more detail herein.

There exists, therefore, a significant need in the art for an LED grow light system that optimizes the light output spectrum for plant growth through deployment of multiple differently colored LEDs deigned to replicate the sun and/or HPS lamp light output intensities at wavelengths conducive for plant growth at a relatively low input power, and includes an enhanced cooling system that includes a heatsink with a plurality of heat dissipating fins and a set of heat transfer pipes drawing heat energy away from a circuit board with the heat generating LEDs thereon to a series of heatsink fins positioned for convection cooling within a vented heat sink housing. The present invention fulfills these needs and provides further related advantages.

SUMMARY OF THE INVENTION

In one embodiment, an LED grow light system as disclosed herein may include the combination of at least a first LED that includes a 4,000 K LED having a first light output, at least one of a second LED having a second light output in about an orange spectra, at least one of a third LED having a third light output in about a green/yellow spectra, and at least one of a fourth LED having a fourth light output in about a red spectra. Here, the combination of the first light output, the second light output, the third light output, and the fourth light output may combine into an aggregate light output that mimics a full spectrum of sunlight at a relatively low input power of about 600-650 watts. More specifically, the orange spectra of the second light output may include visible light output at wavelengths of about 610-640 nm, the yellow/orange spectra of the third light output may include visible light output at wavelengths of about 575-595 nm, and the red spectra of the fourth light output may include visible light output at wavelengths of about 640-680 nm. As such, the aggregate light output may include approximately 900-1,100 mW at wavelengths of about 430-470 nm, 900-1,100 mW at wavelengths of about 540-575 nm, 900-1,600 mW at wavelengths of about 585-615 nm, and 900-1,100 mW at wavelengths of about 620-650 nm.

In another aspect of this embodiment, a string of LEDs may be electrically coupled in series, and specifically the string may include six of the first LEDs and one of the second LED, the third LED, or the fourth LED. Here, the LED grow light system may include an aggregate of 196 LEDs that include a mixture of 168 of the first LEDs, 12 of the second LEDs, 12 of the third LEDs, and four of the fourth LEDs. As such, the string may include 28 strings (each including six of the first LEDs and one of the second LED, the third LED, or the fourth LED) that electrically couple in parallel to one another. In this embodiment, the 28 strings may have an aggregate current of about 10,800-11,400 milliamps and an aggregate forward voltage of about 50-56 volts. One or more LED drivers (e.g., a pair of LED drivers) may also couple in parallel with the 28 strings and include at least a 53 volt output and at least a 5,600 milliamp output to power the LED grow light system.

Each of the 168 first LEDs, the 12 second LEDs, the 12 third LEDs, and the four fourth LEDs may be intermittently located on a circuit board to uniformly distribute the aggregate light output in a substantially even array of the first light output, the second light output, the third light output, and the fourth light output. In another aspect of the embodiments disclosed herein, the aggregate light output may include a peak intensity output at wavelengths of about 590-610 nm; and the first LED may include a forward voltage of about 8.5 volts at a 400 mA drive current and each of the second LED, the third LED, and the fourth LED may include a forward voltage of about 2.0 volts at a 400 mA drive current. Additionally, a controller may adjust a drive current of each of the first LED, the second LED, the third LED, and the fourth LED in real-time.

In another embodiment, the LED grow light system may include a frame and a circuit board coupled with the frame and including a plurality of differently colored LEDs coupled thereto for generating a light output having an intensity of about 1,000 to 1,400 mW at wavelengths between about 575-625 nm at an input power of about 600-650 watts. The light output may include a peak intensity at wavelengths between about 585-615 nm. Additionally, the LED grow light system may include a heatsink in heat transfer relation with the circuit board for drawing heat energy away from the circuit board and the plurality of LEDs during operation of the LED grow light system to maintain the circuit board and the plurality of LEDs at or below a threshold maximum operating temperature. The heatsink may also include a plurality of heat dissipating fins to facilitate heat dissipation from the circuit board and/or the plurality of LEDs and the frame may include a vented housing facilitating convection cooling of the heatsink and/or the plurality of heat dissipating fins.

Moreover, the LED grow light system as disclosed herein may include a fluid circulation system that includes a plurality of heat transfer pipes in conductive heat transfer relation relative to the heatsink or the circuit board. Here, the heatsink may include a plurality of longitudinal cutouts each having a size and shape to selectively receive and retain at least one of the respective heat transfer pipes. In this respect, the heatsink and the heat transfer pipes within the cutouts may cooperate to form a substantially flat heat transfer surface positionable adjacent the circuit board. This may allow a conductive paste to be coextensively disposed in between the substantially flat heat transfer surface of the heatsink and the circuit board in conductive heat transfer relation at a relatively lower thermal impedance than direct flush mounting the circuit board to the substantially flat heat transfer surface. The plurality of longitudinal cutouts may include semicircular channels and the heat transfer pipes may each include a semicircular pipe section with an arcuate side that engages a respective semicircular channel in the heatsink and an oppositely positioned flattened side outwardly presented in flush relation with the heatsink (of which forms part of the substantially flat heat transfer surface along with the heatsink). In this embodiment, the arcuate side of the semicircular pipe section may engage the semicircular channels in soldered relatively low thermal impedance heat transfer relation. Additionally, the cooling system of the LED grow light system may also include a plurality of heatsink fins coupled with the frame in convection cooling relation with the fluid circulation system to cool fluid within the heat transfer pipes. In one embodiment, the plurality of heat transfer pipes may include at least a pair of centrally located heat transfer pipes (for transfer of heat energy away from the relatively higher temperature core) and a pair of edge-based heat transfer pipes (to facilitate even cooling thereof).

Additionally, a shoulder downwardly extending from the heatsink may generally encompass the circuit board and the plurality of LEDs therein and cooperate with a glass cover coupled in sealingly relation therewith by an O-ring to hermetically encase the circuit board and the plurality of LEDs therein. The glass cover may include a substantially transparent material or a filter material that regulates the wavelengths of light output from the LEDs coupled to the circuit board. Furthermore, a deflector shield may generally extend downwardly and outwardly from the shoulder for concentrating the light output into a general pyramidal shape to maximize light distribution.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 15 is a table more specifically illustrating the power output at specific wavelengths illustrated in the power output graph of FIG. 14.

DETAILED DESCRIPTION OF THE PREFERRED EMBODIMENTS

Figure 1:
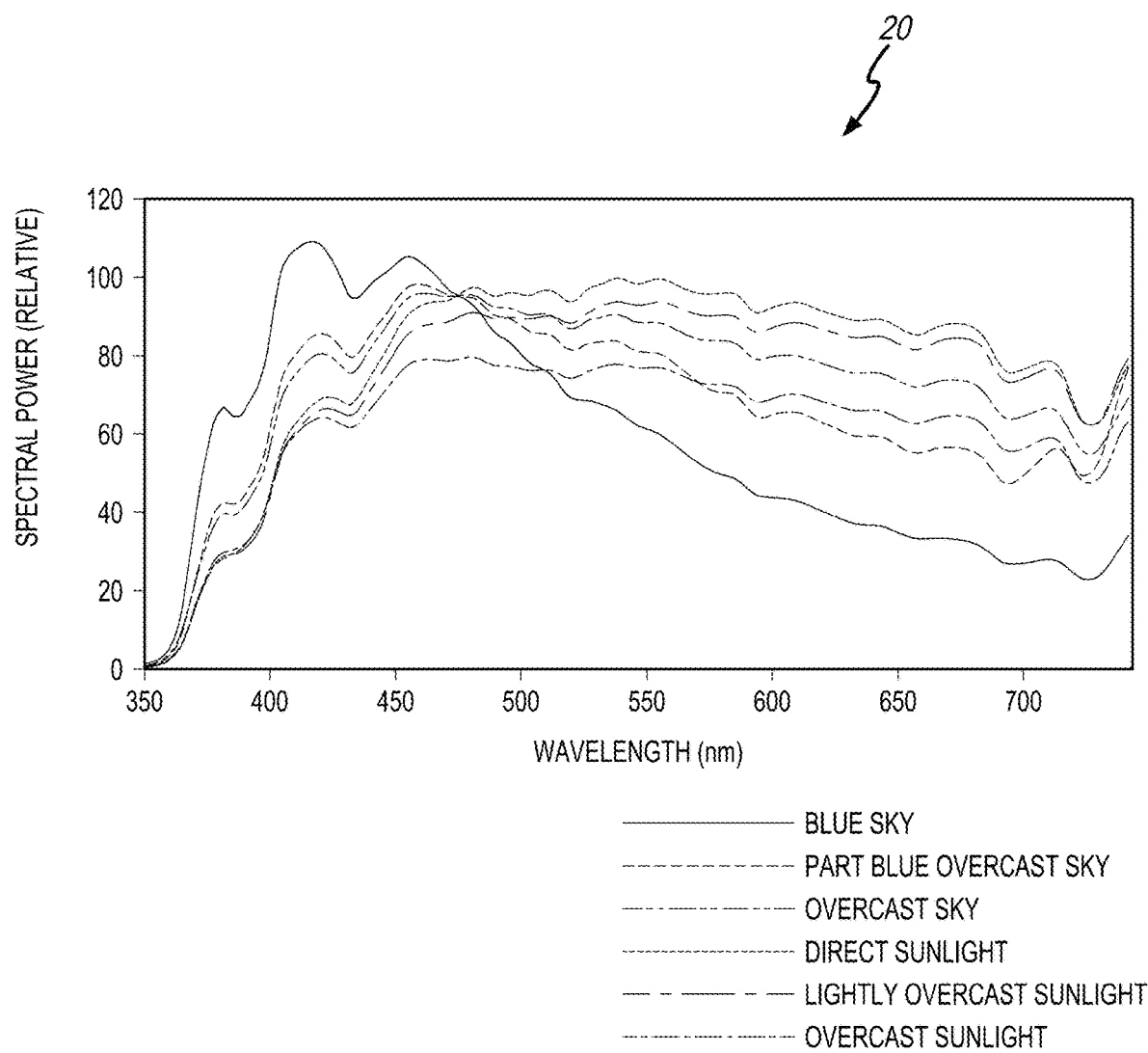
FIG. 1 is a sun light spectrum graph illustrating variations in relative spectral power of light output that reaches Earth during various atmospheric conditions at wavelengths between about 350 nm and 740 nm.
Figure 2:
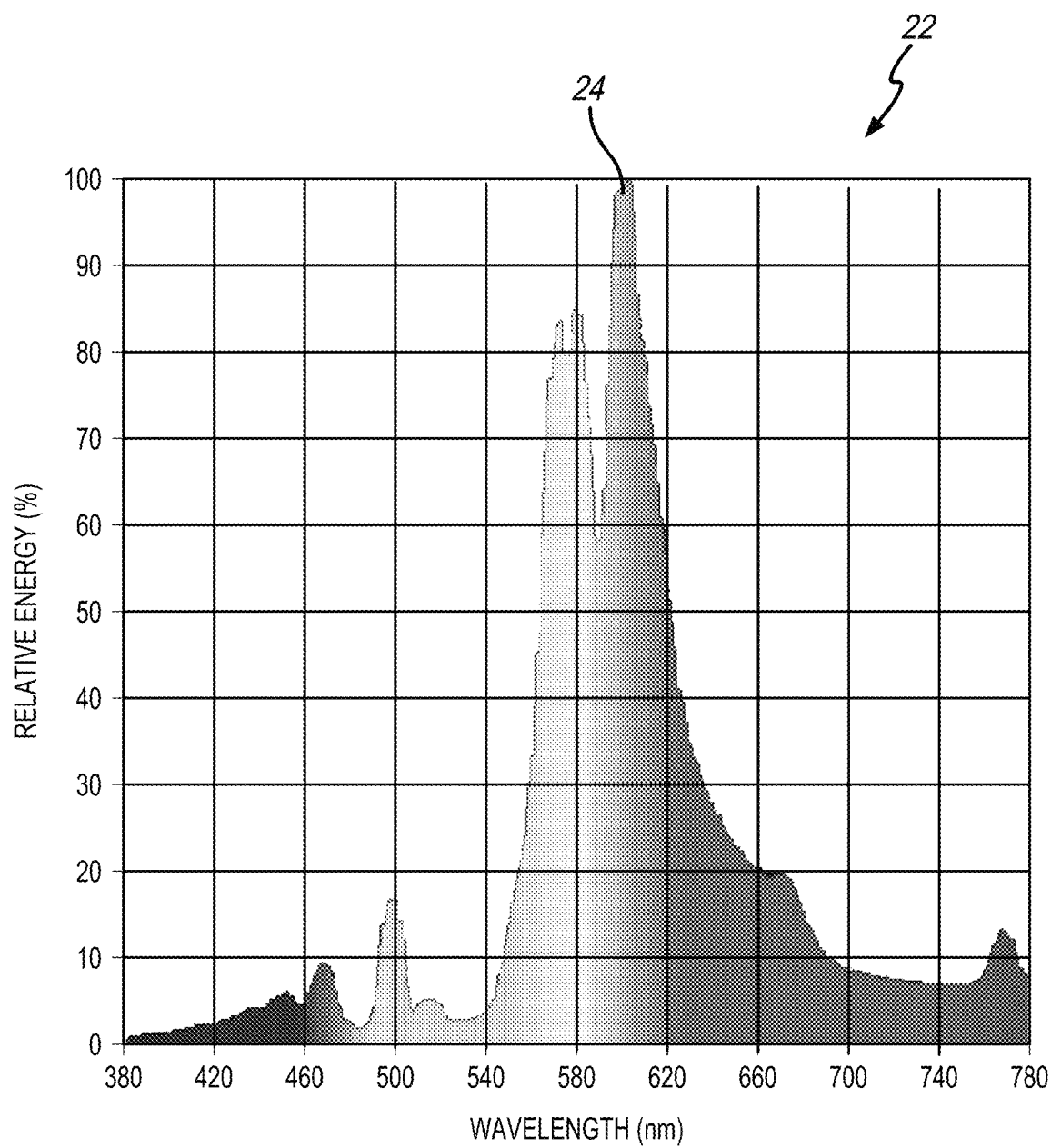
FIG. 2 is an HPS lamp light spectrum graph illustrating variations in relative energy of light output of an HPS lamp at wavelengths between 380 nm and 780 nm.
Figure 3:
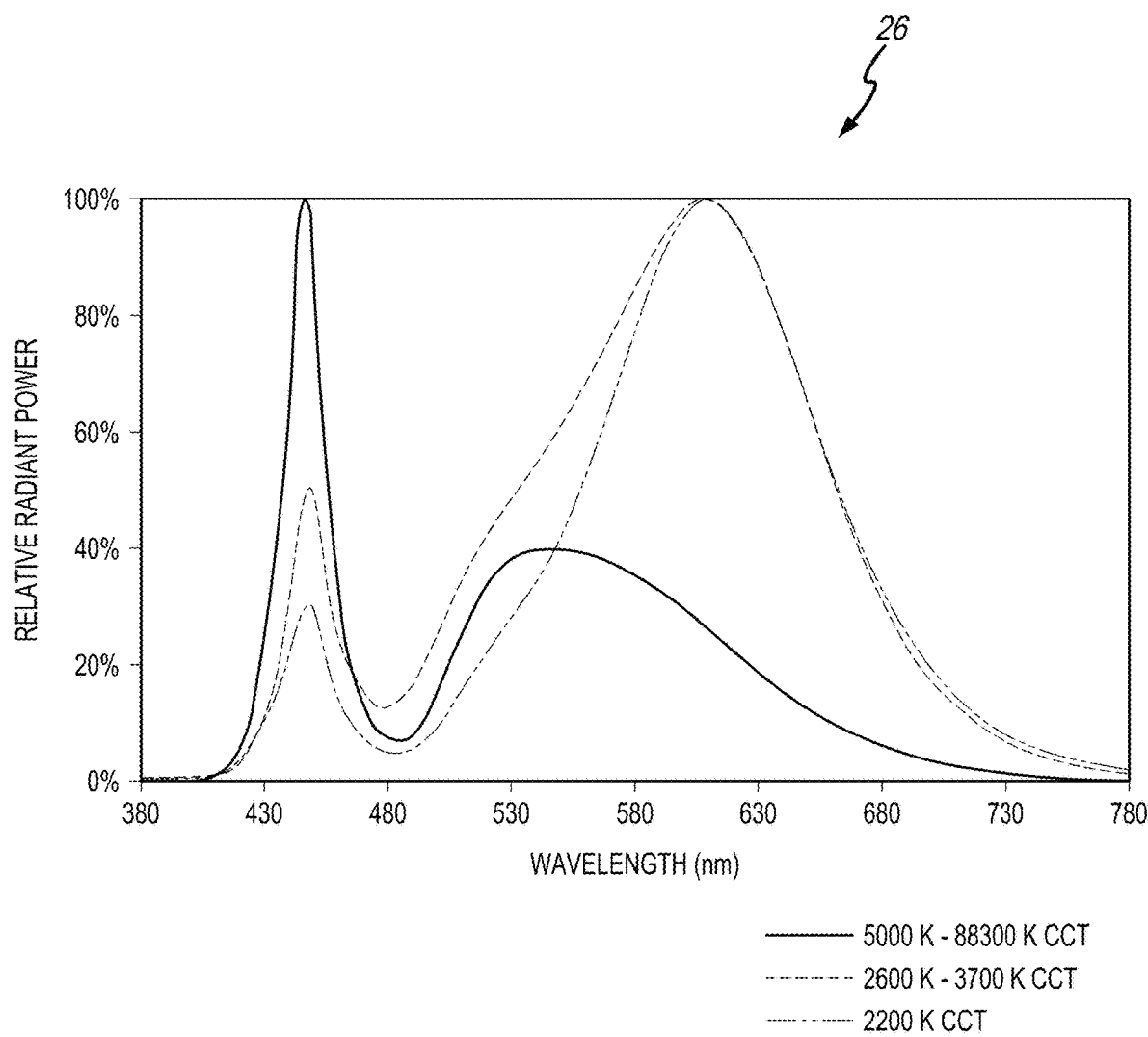
FIG. 3 is a tri-LED light spectrum graph illustrating variations in relative radiant power of light output at wavelengths between 380 nm and 780 nm for a set of three LEDs having different color temperature and color rendering indices, the combination of which produces a spectrum closer to that of the HPS lamp light spectrum graph of FIG. 2.
Figure 4:
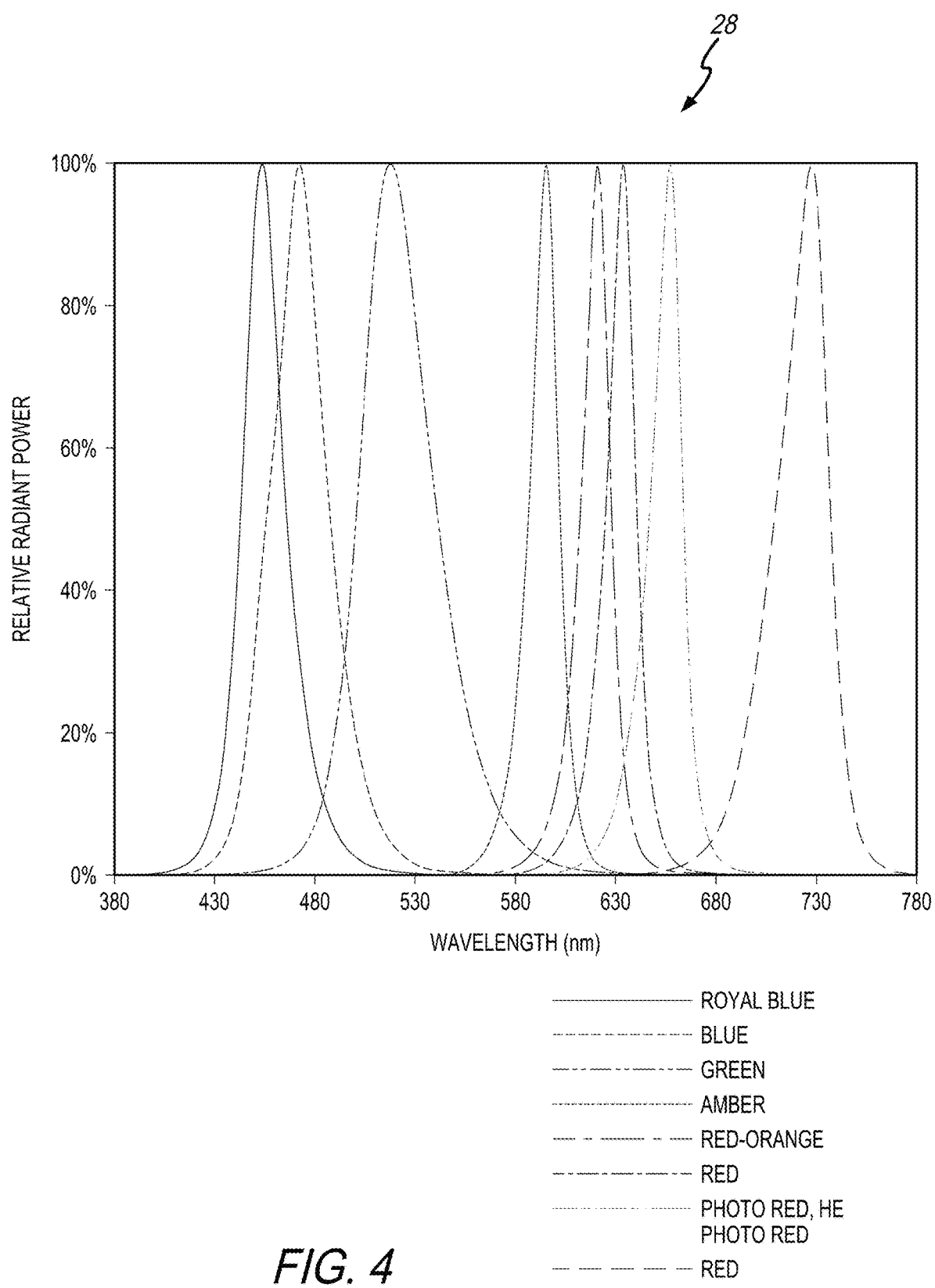
FIG. 4 is an octo-LED light spectrum graph illustrating variations in relative radiant power of light output at wavelengths between 380 nm and 780 nm emitted for a set of eight LEDs having different color temperature and color rendering indices, including in an orange/red light spectrum, the combination of which produces a more complete spectrum than that of the HPS lamp light spectrum graph of FIG. 2 and the tri-LED light spectrum graph of FIG. 3 yet at higher than desired intensities optimal for plant growth.

As shown in the exemplary drawings for purposes of illustration, the present invention for an LED grow light system is generally referred to by the reference numeral 30 in FIGS. 5-13. In general, the LED grow light system 30 utilizes a combination of LEDs to emphasize certain light output spectra to provide for a more efficient plant growth rate per unit of input power during various stages in the growth cycle of a plant. This can be accomplished, e.g., in one embodiment, by mimicking the light output spectrum of the sun. Here, the LED grow light system 30 may generate light output at wavelengths and corresponding intensities commensurate in scope with those illustrated with respect to the sun light spectrum graph 20 in FIG. 1. Additionally, in an alternative embodiment, given the past success of HPS lamps in plant grow light systems, one potentially efficient and effective way to design the LED grow light system 30 disclosed herein is to tailor the peak light output wavelengths to be in the same or similar region as those of the HPS lamps. This may be accomplished, e.g., by mimicking the light output spectrum of an HPS lamp. Here, the LED grow light system 30 may generate light output at wavelengths and intensities commensurate in scope with those of the HPS lamp light spectrum graph 22 illustrated in FIG. 2. Accordingly, the resultant LED grow light system 30 may have comparable plant growth results (at least comparable to those of HPS lamps) based on the vast amount of experimental information obtained over the years in using the HPS lamp as a plant grow light with respect to certain spectrums and intensities. Although, the LED grow light system 30 is advantageous over HPS lamps because the LED grow light system 30 has an overall lower TCO as a result of higher energy efficiencies and enhanced plant growth rates (even when compared to natural sunlight).

Figure 5:
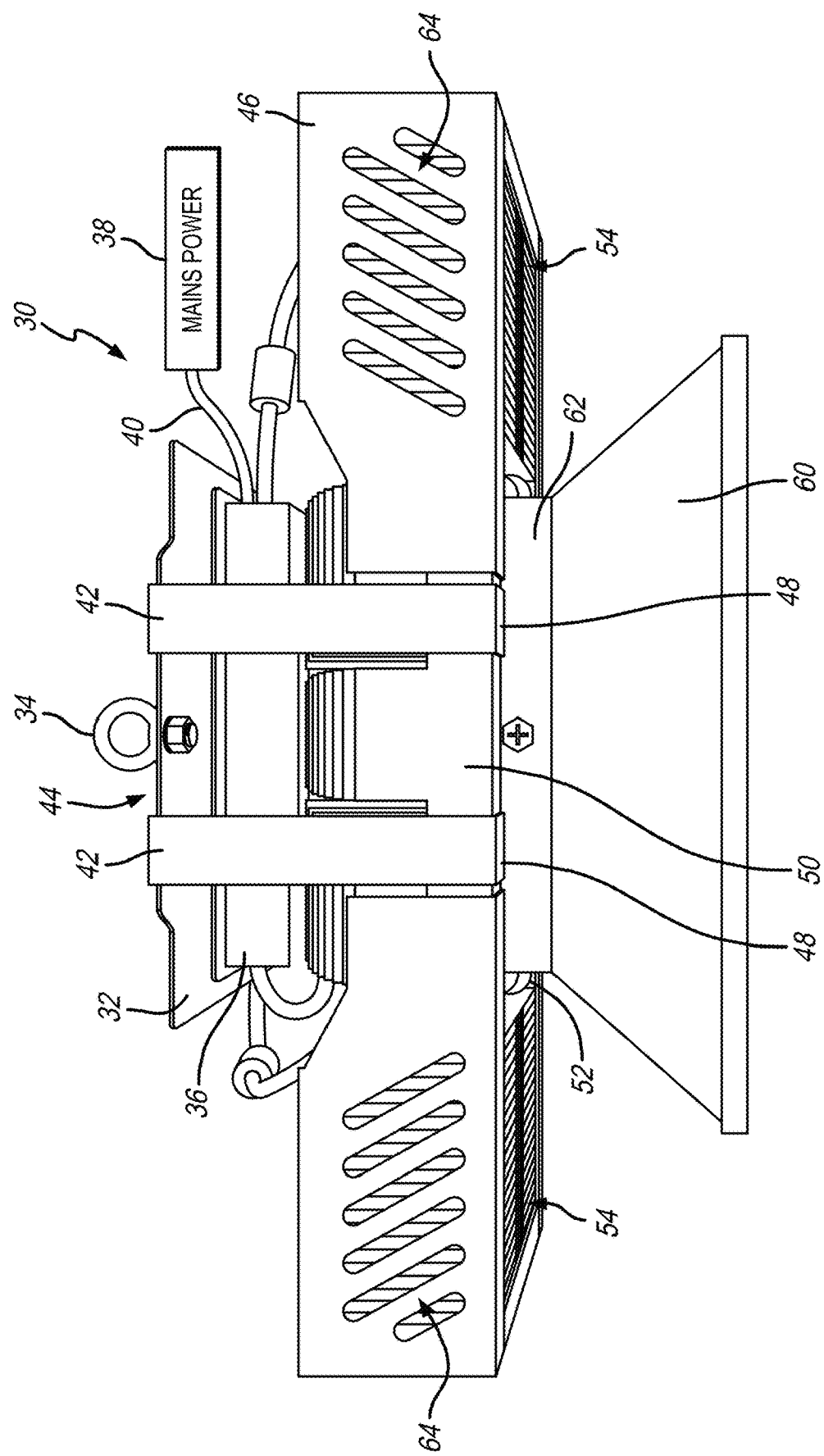
FIG. 5 is a side view of one embodiment of an LED grow light system as disclosed herein.

In one embodiment as illustrated in FIG. 5, the LED grow light system 30 may include a housing fixture 32 that generally provides the framework for forming the LED grow light system 30 and retaining the related components as described in more detail herein. More specifically, FIG. 5 illustrates that the housing fixture 32 includes a mounting eyelet 34 generally upwardly extending away from the housing fixture 32 and including a size, shape, and rigidity sufficient to hang the LED grow light system 30 above, e.g., plants positioned thereunder to receive the light output therefrom. Additionally, a power source 36 may couple underneath where the mounting eyelet 34 extends from the housing fixture 32. The power source 36 may receive energy by way of a mains power supply 38 coupled thereto by a power cord 40, to provide the energy necessary for the power source 36 to operate the LED grow light system 30 as disclosed herein. In alternative embodiments, the power source 36 could be a battery or the like, or the combination of a battery and a hardwire connection to the mains power supply 38.

Figure 6:
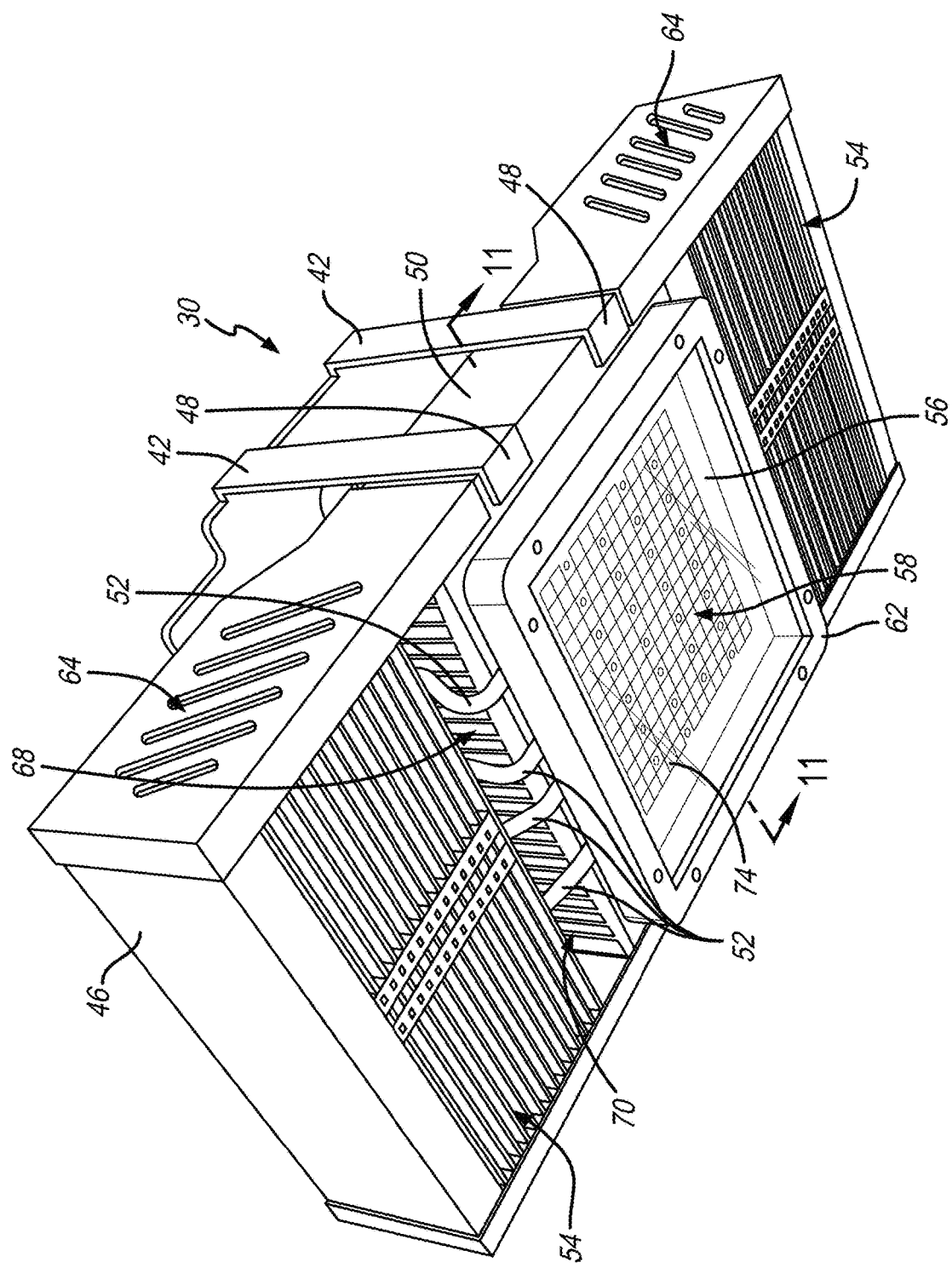
FIG. 6 is a perspective view of the LED grow light system of FIG. 5 after removal of a deflector shield, further illustrating a plurality of light output generating LEDs and a heatsink cooling system.
Figure 7:
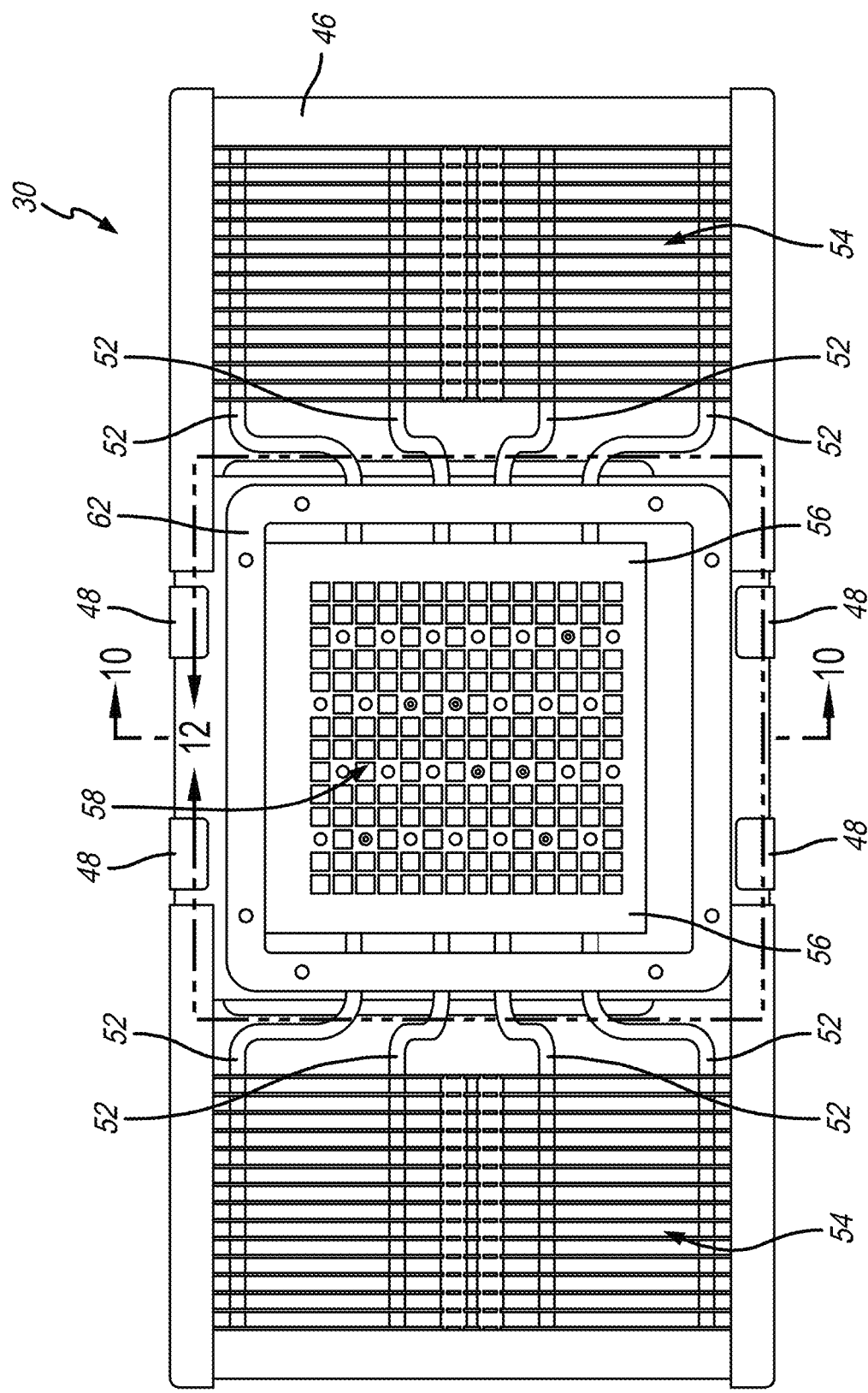
FIG. 7 is a bottom plan view of the LED grow light system of FIG. 6, further illustrating the arrangement of the LEDs and the heatsink cooling system.
Figure 8:
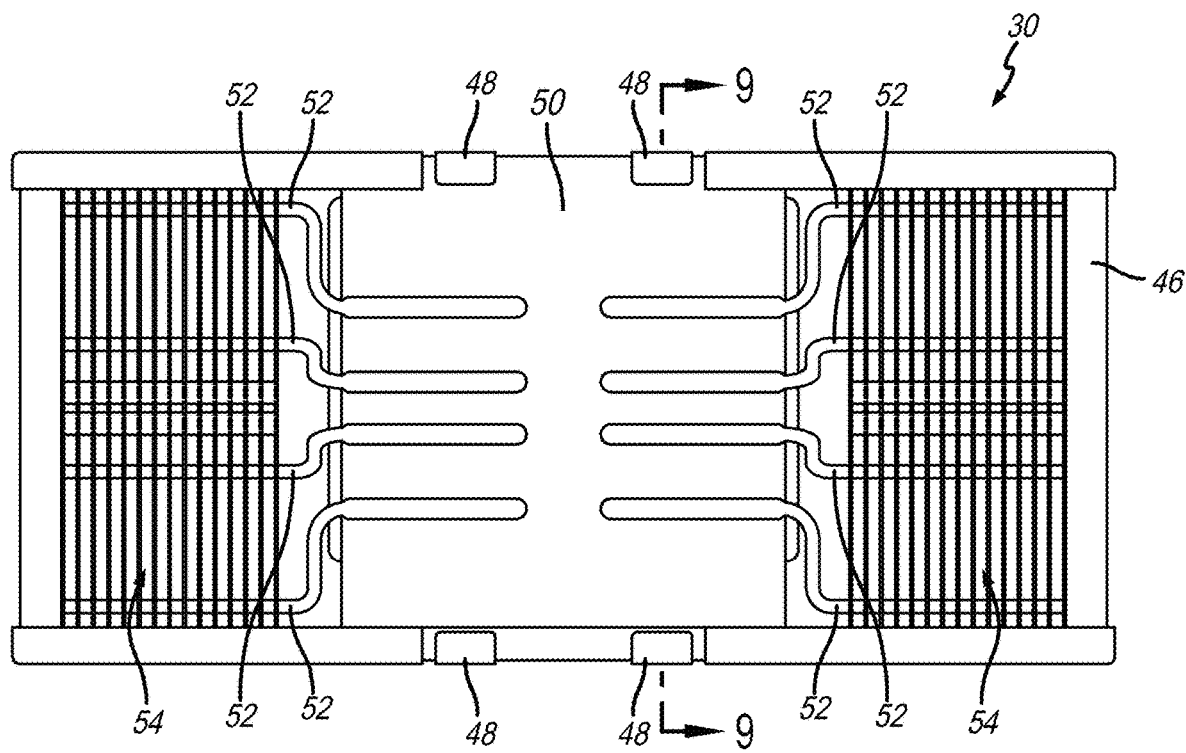
FIG. 8 is a bottom plan view of the LED grow light system of FIG. 7 after removal of a circuit board having the plurality of LEDs thereon, further illustrating a series of heat transfer pipes channeled flush within the heatsink and extending out into heat exchange relationship with a plurality of heatsink fins for convection cooling.

Additionally, the housing fixture 32 may include a pair of downwardly extending vertical support arms 42 that couple to a top surface 44 of the housing fixture 32 on one end (FIG. 5), and couple up underneath a vented heat sink housing 46 by a set of respective inwardly projecting feet 48 on an opposite end thereof (FIGS. 6-7). This way, the housing fixture 32 has sufficient depth to generally carry a heatsink 50, a series of heat transfer pipes 52, and a corresponding set of heatsink fins 54 therein positioned for convection cooling the series of heat transfer pipes 52 as discussed in more detail below. Moreover, as further illustrated in FIGS. 6 and 7, a circuit board 56 may include a plurality of LEDs 58 thereon for generating the desired light output spectra. Of course, the light output spectra may be concentrated generally downwardly on to plants thereunder (e.g., when the LED grow light system 30 is hung by the mounting eyelet 34) by a deflector shield 60 as illustrated in FIG. 5. This facilitates the concentrated emission of light output from the LED grow light system 30 in a general pyramidal shape, the intensity of which decreases at the rate of the inverse square law. In operation, the mains power supply 38 may supply electrical energy to the power source 36 electrically coupled to the underlying circuit board 56 having the plurality of LEDs 58 thereon. During operation, the power source 36 draws power from the mains power supply 38 by way of the power cord 40 for supply to the circuit board 56 to energize the LEDs 58 thereon, thereby generating light output from the deflector shield 60 having respective wavelengths and intensities as disclosed herein.

FIG. 6 is a perspective view illustrating the front, left, and bottom sides of the LED grow light system 30. Although, in FIG. 6, the deflector shield 60 illustrated in FIG. 5 has been removed from a mounting shoulder 62 downwardly extending from the heatsink 50. The mounting shoulder 62 may include multiple threaded apertures for select engagement with the heatsink 50 by way of screws or the like. Moreover, the deflector shield 60 may clip to the shoulder 62, may attach thereto by a series of screws, or otherwise couple thereto by any mechanical and/or adhesive attachment mechanism known in the art. Accordingly, FIG. 6 further illustrates that the arrangement of the LEDs 58 mount to the circuit board 56 up underneath and generally positioned within the shoulder 62.

As shown best in FIGS. 5 and 6, the vented heat sink housing 46 may generally include a box like structure that includes a plurality of vents 64 therein to facilitate convection cooling during use of the LED grow light system 30. Heat generated by the LEDs 58 coupled to the circuit board 56 may generally transfer to the heatsink 50 coupled thereto by conduction. In particular, a conductive pad or paste 66 (best shown in the cross-sectional views of FIGS. 10-11) may help facilitate the transfer of heat energy away from the circuit board 56 to the heatsink 50 by lowering the thermal impedance therebetween, similar to conductive pastes used in computer processors. Similar in this respect, the heatsink 50 may also include a plurality of upwardly extending and intermittently positioned heat dissipating fins 68 that include a respective set of ducts 70 formed therebetween. Circulating air may enter the vented seat sink housing 46 through the one or more vents 64 such that the alternating arrangement of the heat dissipating fins 68 and the ducts 70 permits passage of relatively cooler inlet air over and in between a relatively large surface area of the heat dissipating fins 68. Doing so transfers heat energy from the heat dissipating fins 68 to the relatively cooler atmospheric inlet air for eventual removal out from the vented heat sink housing 46. Thus, relatively cooler atmospheric air travels over and in between the heat dissipating fins 68 and the ducts 70 and increases in temperature as heat energy transfers thereto from the relatively higher temperature heatsink 50. The heated air is then pushed out from within the vented heat sink housing 46 (e.g., by way of one or more of the vents 64) as relatively higher temperature heated air where it will cool to ambient air temperatures outside of the LED grow light system 30. This way, a continuous supply of relatively cooler air can be drawn into the heatsink 50 for convection cooling during operation.

To further facilitate cooling of the circuit board 56 by the heatsink 50, the LED grow light system 30 may include one or more of the heat transfer pipes 52 as shown generally in FIGS. 6-11. More specifically, the power source 36 may operate a pump that circulates a fluid (e.g., water) within the heat transfer pipes 52 for passage in between the heatsink 50 and the conductive paste 66 to further facilitate conduction cooling of the circuit board 56 during operation of the LED grow light system 30. For instance, the perspective view of FIG. 6 illustrates four of the heat transfer pipes 52 exiting out from in between the heatsink 50 and the circuit board 56 on a left side thereof (the right side being a mirror image thereof). The bottom plan view of FIG. 7 more specifically illustrates this arrangement, including that each of the heat transfer pipes 52 extend away from the heat generating LEDs 58 coupled to the circuit board 56 into adjacent relation with the plurality of heatsink fins 54. In one embodiment, the two interior heat transfer pipes 52 may be relatively closer together and positioned generally toward a center of the LED grow light system 30 to facilitate a more uniform overall temperature at the heatsink 50, thereby also lowering the peak temperature of the LEDs 58 on the circuit board 56. In a specific embodiment, since more heat may accumulate near the center of the circuit board 56 than the edges, the two interior heat transfer pipes 52 may be positioned approximately ½ inch from a centerline of the heatsink 50 and each of the two outer heat transfer pipes 52 may be positioned approximately two (2) inches from the centerline.

Figure 9:
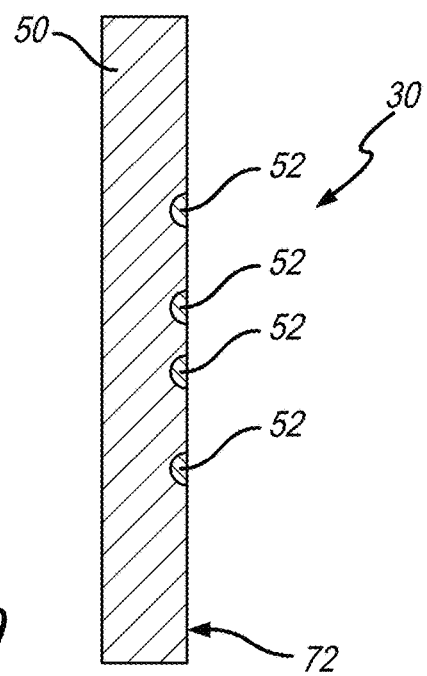
FIG. 9 is a cross-sectional view taken about the line 9-9 in FIG. 8, further illustrating the series of heat transfer pipes channeled flush within the heatsink.
Figure 10:
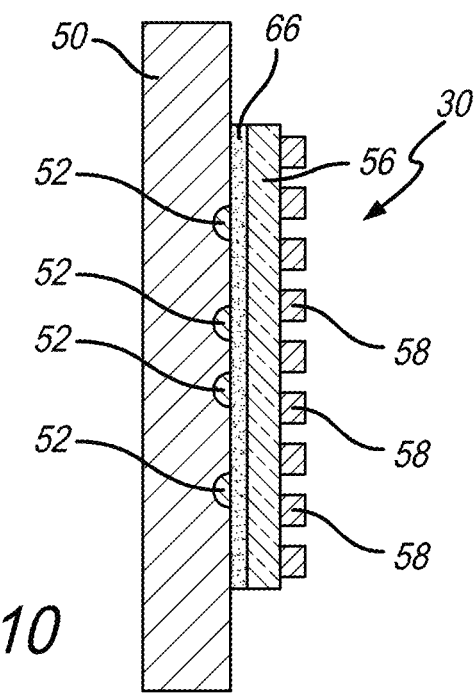
FIG. 10 is a cross-sectional view taken about the line 10-10 in FIG. 7, further illustrating the circuit board with the plurality of LEDs thereon flush mounted to the heat sink by a conductive paste.
Figure 11:
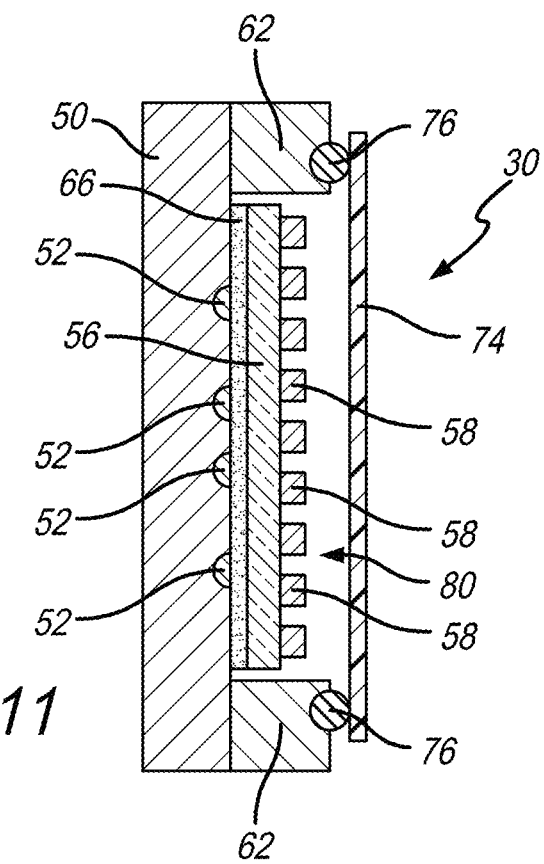
FIG. 11 is a cross-sectional view taken about the line 11-11 in FIG. 6, further illustrating a glass cover sealing the circuit board and the plurality of LEDs within an air/water tight space with an O-ring coupled to a vertical extension of the heatsink.

Similar to the convection cooling described above with respect to the heat dissipating fins 68 and the ducts 70, fluid within the heat transfer pipes 52 may be at a relatively lower temperature before entering in between the conductive paste 66 and the heatsink 50. Here, as best shown in FIGS. 9-11, each of the heat transfer pipes 52 may flatten out along an interior surface 72 of the heatsink 50, as shown best in FIG. 9. In this respect, the conductive paste 66 may be disposed coextensive along the interior surface 72 (FIG. 9) of the heatsink 50 in adjacent relation relative thereto. This essentially allows the conductive paste 66 to form a flat surface along the interior surface 72 of the heatsink 54 for placement of the circuit board 56 thereover as generally illustrated in FIGS. 10 and 11. The fact that the heat transfer pipes 52 flatten when extending in between the heatsink 50 and the conductive paste 66 increases the surface area exposure of the fluid traveling through the heat transfer pipes 52 with the conductive paste 66. This may effectively increase the heat transfer from the superheated conductive paste 66 to the fluid traveling within the heat transfer pipes 52 to more efficiently draw heat energy away from the circuit board 56 to extend the life of the LEDs 58 operating thereon by maintaining the circuit board 56 and the LEDs 58 thereon at an optimum operating temperature. The temperature may be regulated in real-time by a controller coupled to a temperature sensor disposed in adjacent relation to the circuit board 56.

Each of the heat transfer pipes 52 then extend away from the heat being generated by the LEDs 58 on the circuit board 56 for travel in and among the plurality of heatsink fans 54 position generally at lateral sides of the LED grow light system 30. The heatsink fins 54 may be vertically position within the vented heat sink housing 46 for passage of air therethrough, similar to the heat dissipating fins 68 and the related ducts 70, for enhanced convection cooling of the heated fluid exiting the interface between the conductive paste 66 coupled to the heat generating circuit board 56 and the heatsink 50, by way of the heat transfer pipes 52. After cooling, the pump may re-circulate the now relatively cooler fluid in and around the heatsink fins 54 back in between the heatsink 50 and the conductive paste 66 to again draw heat energy away from the circuit board 56 as part of a continual cycle to maintain the LEDs 58 at a desired operating temperature.

In one aspect of these embodiments, the heatsink 50 may include arcuate or semicircular channels having a size and shape to selectively receive and retain the heat transfer pipes 52 therein. As briefly mentioned above, the heat transfer pipes 52 may generally flatten out for passage through the heatsink 50. Here, the semicircular side of the flattened heat transfer pipes 52 may engage within the arcuate or semicircular channels of the heatsink 50 (see FIGS. 9-11) in soldered relatively low thermal impedance heat transfer relation so heat energy may efficiently conduct from the heatsink 50 to fluid traveling through the heat transfer pipes 52 and to the heatsink fins 54. Once outside the interface between the heatsink 50 and the thermal paste 66 underneath the circuit board 56, the heat transfer pipes 52 may be a generally round pipe and may attach to or otherwise couple in thermal energy transfer relation with the heatsink fins 54. In embodiments wherein the LED grow light system 30 is hung vertically from the mounting eyelet 34, the heatsink fins 54 may be generally vertically positioned as illustrated in FIG. 5 such that the heatsink fins 54 can more efficiently cool fluid within the heat transfer pipes 52 by natural convection without forced air. This may save energy without powering any cooling fans. Although, in an alternative embodiment, one or more external cooling fans may generally force airflow through the vented heat sink housing 46 (e.g., through the vents 64 and over the heatsink fins 54) to more quickly draw heat energy away from the heatsink 50 and the LED grow light system 30. Such external cooling fans may be coupled to the vented heat sink housing 46 or otherwise positioned nearby.

In another aspect of the embodiments disclosed herein, the LED grow light system 30 may include a glass cover 74 (FIGS. 6 and 11) that couples in sealingly relationship with an O-ring 76 coupled to the shoulder 62 that generally extends outwardly from the base of the heatsink 50 and surrounds the circuit board 56 with the LEDs 58 thereon. The glass cover 74 may be substantially transparent to facilitate passage of light output from the LEDs 58 underneath; or the glass cover 74 may include one or more filters that regulate the light output wavelengths emitted from the LED grow light system 30. The O-ring 76 may be made from a high temperature silicone material or the like for use in high temperature ranges, such as those that may be generated by the LED grow light system 30. As best shown in FIG. 11, the heatsink 50, the shoulder 62, the O-ring 76, and the glass cover 74 cooperate to form an internal enclosure or air/water tight space 80 generally protecting the internally positioned LEDs 58 from unwanted moisture and/or other harmful materials in the atmospheric environment. For instance, for horticulture applications, the LED grow light system 30 may be deployed for use in a closed and/or humid environment as a result of watering plants by misters. This can result in the deposit of water vapor or water droplets onto the LEDs 58 if not protected from the external environment. Thus, sealing the LEDs 58 and the circuit board 56 within the air/water tight space 80 ensures that each remains dry during operation. Encasing the light spectrum generating LEDs 58 within the air/water tight space 80 may increase operational longevity thereof.

Figure 12:
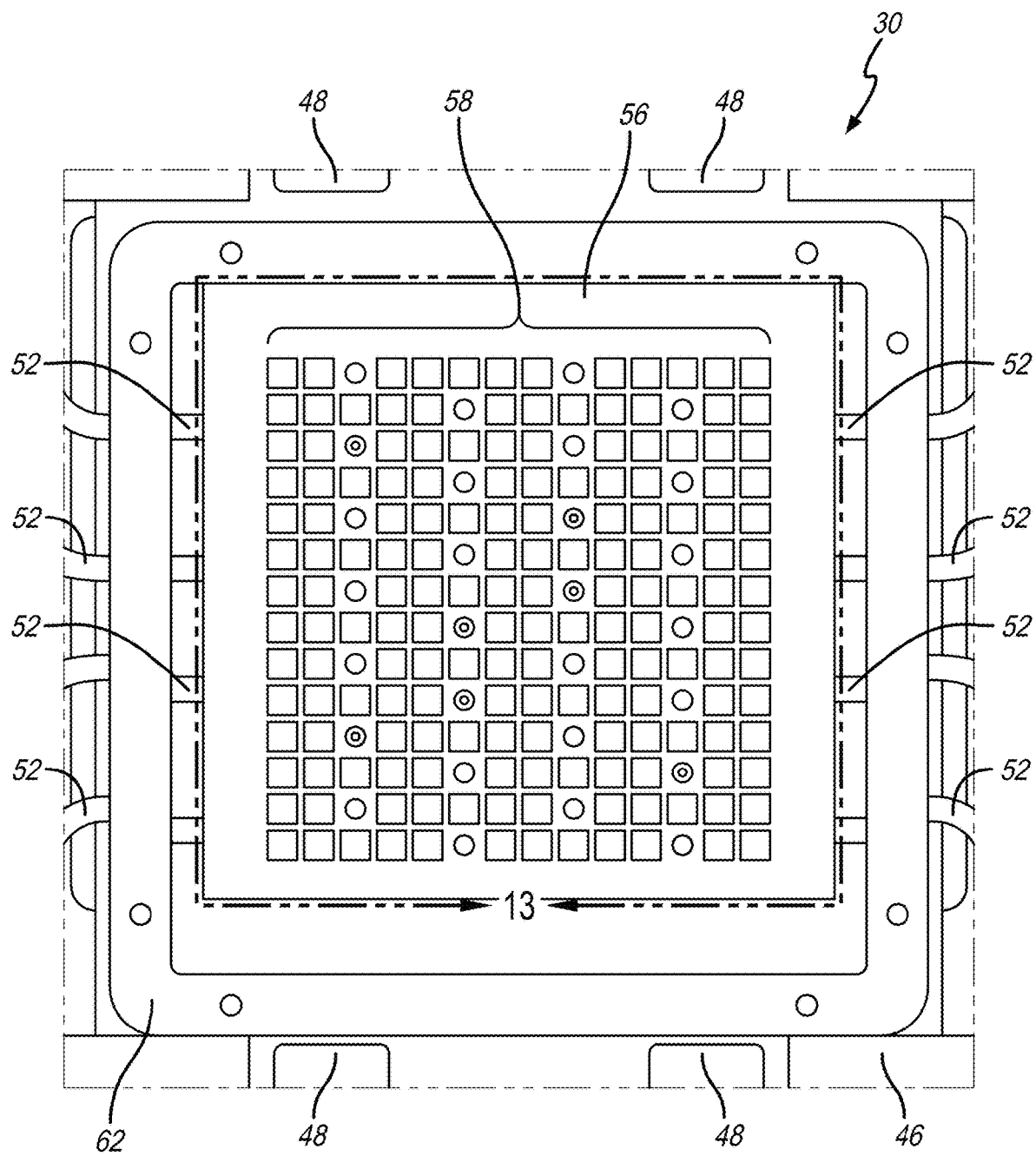
FIG. 12 is an enlarged bottom plan view of the LED grow light system taken about the rectangle 12 in FIG. 7, further illustrating the circuit board with the plurality of multi-colored LEDs thereon.
Figure 13:
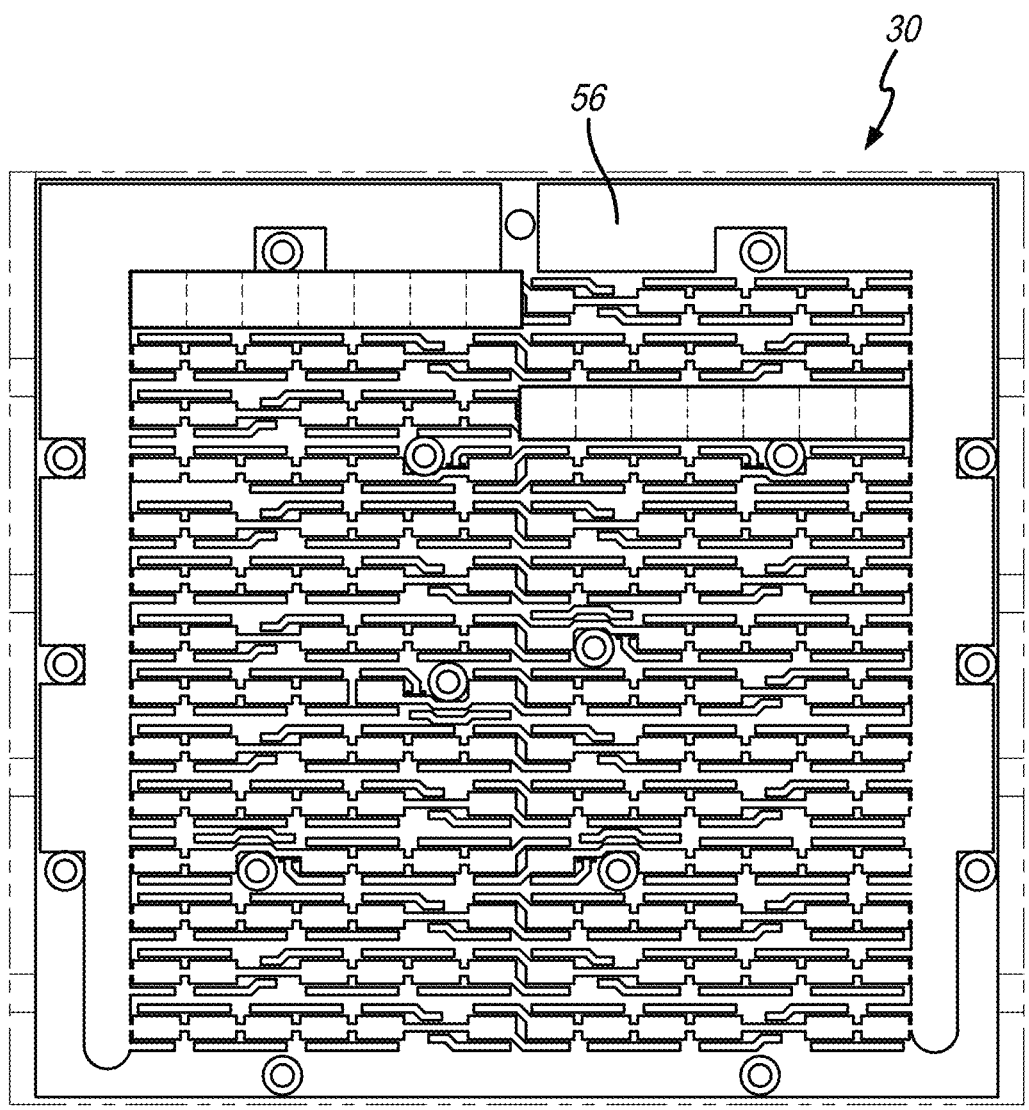
FIG. 13 is a bottom plan view of the circuit board taken generally about the rectangle 13 in FIG. 12.

As illustrated in the enlarged bottom plan view of FIG. 12, the circuit board 56 may include four different colored LEDs 58 soldered thereto with electrical connections electrically coupled with the power source 36. Together, the four differently colored LEDs 58 may produce an aggregate light output spectrum 82 similar to that illustrated with respect to a power output graph 84 in FIG. 14. As illustrated in FIGS. 12 and 13, the LEDs 58 may be placed as close together as possible without increasing junction temperatures therein— the vented heat sink housing 46 (and the corresponding vents 64), the heatsink 50, the heat transfer pipes 52, the heatsink fins 54, the conductive paste 66, and the heat dissipating fins 68 may help regulate junction temperatures as discussed above. That is, the enhanced heatsink cooling system as disclosed herein may allow for a more compact design since more LEDs 58 may be positioned relatively close together on the circuit board 56 without increasing temperatures therein. Moreover, closely spacing differently colored LEDs 58 allows for better overlapping of the light output spectrum such that the color intensity profile is relatively more uniform, thereby facilitating uniform color illumination of the plants underneath the LED grow light system 30.

Figure 14:
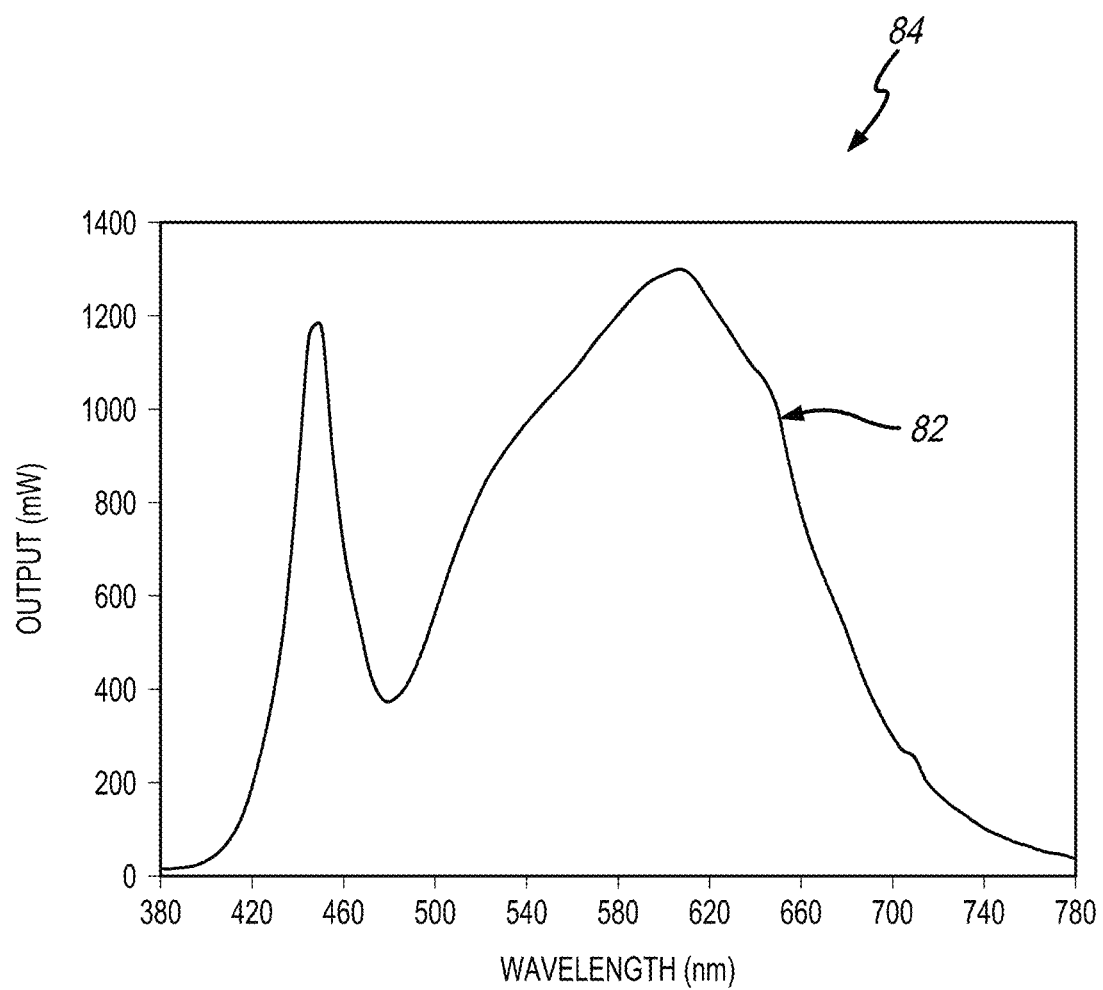
FIG. 14 is a power output graph illustrating power output in milliwatts ("mW") across a full light spectrum at wavelengths of about 380-780 nm.

To achieve the light out spectrum illustrated in FIG. 14, in one embodiment, differently colored LEDs 58 (e.g., four or more) may be used to achieve the desired spectral intensities illustrated therein. For example, in some embodiments, the drive current for each of the differently colored LEDs 58 may be adjusted by a controller and without the use of power dissipating components such as resistors, power regulators, etc. In one embodiment, the adjustments may be made through the topology used in the connections of the LEDs 58. For example, FIGS. 12-13 illustrate a layout of the circuit board 56 for driving a combination of the four different colored LEDs 58 connected in series and in parallel. Here, current regulation through each of the LEDs 58 may help produce the desired light output power (e.g., as illustrated in FIG. 14). Thus, the LED grow light system 30 may achieve a relatively higher operating efficiency (i.e., at lower power consumption) without the use of power dissipating electronic components.

In one embodiment, the combination of the LEDs 58 may include: (1) Xlamp MHD-E (4,000K) LEDs manufactured and sold by Cree, Inc. of 4600 Silicon Drive, Durham, N.C. 27703; (2) XPE Red (620-630 nm) LEDs manufactured and sold by Cree, Inc. of 4600 Silicon Drive, Durham, N.C. 27703; (3) XPE Amber (585-595 nm) LEDs manufactured and sold by Cree, Inc. of 4600 Silicon Drive, Durham, N.C. 27703; and (4) XPE Photo (Hyper) Red (650-670 nm) LEDs also manufactured and sold by Cree, Inc. of 4600 Silicon Drive, Durham, N.C. 27703. In one embodiment, the mixture of the LEDs 58 may include 168 of the Xlamp MHD-E LEDs, 12 of the XPE Red LEDs, 12 of the XPE Amber LEDs and four (4) of the XPE Photo (Hyper) Red LEDs. In this respect, each of the lower quantity XPE LEDs may be intermittently located (e.g., evenly spaced) on the circuit board 56 so that they are "uniformly" distributed in an array to provide as uniform a light output as possible regarding each respective color. This specific combination of the LEDs 58 may produce light output intensity in the orange spectrum that more closely matches that of an HPS lamp at 600 nm and at a lower power input. For example, the light output in the amber wavelength range of 585-595 nm has been found to be more advantageous for cannabis compared to the range from 595-610 nm, especially when combined with white LEDs (designed for general plant growth). As such, the LED grow light system 30 as disclosed herein enjoys the longevity and energy efficiencies of LED lighting systems while also producing comparable plant grow rates of HPS lamps, including with respect to cannabis.

With specific reference to each of the XPE LEDs mentioned above (i.e., the XPE Red (620-630 nm) LEDs; XPE Amber (585-595 nm) LEDs; XPE Photo (Hyper) Red (650-670 nm) LEDs), each include forward voltages of about 2.0 V at 400 mA drive current. In this respect, each of the XPE LEDs has similar electrical power characteristics. Accordingly, in the embodiment identified above that includes a mixture of 12 of the XPE Red LEDs, 12 of the XPE Amber LEDs, and four (4) of the XPE Photo (Hyper) Red LEDs, the circuit board 56 will essentially see a comparable electrical load from each of these 28 LEDs. Moreover, the Xlamp MHD-E (4,000K) LEDs have a forward voltage of about 8.5 V at 400 mA drive current. Including 168 of the Xlamp MHD-E LEDs in the LED grow light system 30 results in 196 total LEDs, or a ratio of six (6) Xlamp MHD-E LEDs to one (1) of the XPE LEDs. Dividing the aggregate of the 196 LEDs into 28 strings results in seven (7) LEDs per string—i.e., six (6) Xlamp MHD-E LEDs to one (1) of the XPE LEDs per string. These seven (7) LEDs may be connected in series to produce a total forward voltage of 53 V (i.e., 6 Xlamp MHD-E LEDs×8.5 V+1 XPE LED×2.0 V=53 V). When all 28 strings connect in parallel, the total current in the LED grow light system 30 is about 11,200 mA (i.e., 28 strings×400 mA=11,200 mA). A controller may balance the current within the system 30 to minimize energy wasting components and/or the controller may regulate the light output of the LED grow light system 30 for custom tailored applications specific to certain plants and their optimal growth rate characteristics. Moreover, two LED drivers, each with 5,600 mA and 53 V outputs, can then connect in parallel to provide the needed power for all 196 LEDs. In one embodiment, the LED driver may include Mean Well HLG-320H-54 LED driver manufactured by MeanWell USA, Inc. of 44030 Fremont Blvd., Fremont, Calif. 94538, which outputs 5,950 mA with a control range up to 54 V. At a nominal voltage of 53 V, the total LED power input may be 53 V×5,950 mA×2 LED drivers=630.7 watts. In another embodiment, the LED driver may include an Artesyn LCC600 LED driver (650 watt power supply) manufactured by Artesyn Embedded Technologies of 2900 South Diablo Way, Suite 190, Tempe, Ariz. 85282, which outputs 11,200 mA (11.2 amps) with a control range up to 54 V. In this embodiment, at a nominal voltage of 53 V, the total LED power input may be 53 V×11,200 mA×2 LED drivers=1,187.2 watts.

The power output graph 84 of FIG. 14 illustrates the light output in milliwatts ("mW") across a full light spectrum (i.e., at wavelengths of about 380-780 nm) for the LED grow light system 30 disclosed herein; and FIG. 15 is a spectral power table 86 illustrating the tabulated results of the spectral power distribution illustrated with respect to FIG. 14. Specifically, the power output of the LED grow light system 30 may include 1,000 mW in the blue spectra (i.e., at wavelengths of about 430-470 nm), may include 1,000 mW in the green spectra (i.e., at wavelengths of about 540-575 nm), may include 1,000-1,500 mW in the orange (i.e., at wavelengths of about 585-615 nm), and may include 1,000 mW in the red spectra (i.e., at wavelengths of about 620-650 nm). This light output spectrum and corresponding intensities may be particularly effective for the growth of cannabis. The emphasis illustrated in FIG. 14 relates to light output wavelengths at a peak of about 600 nm, which more closely matches peak wavelength intensities of HPS lamps.

The spectral power table 86 illustrated in FIG. 15 can be used to determine the relative power intensities within certain wavelength ranges. Chart 1 below illustrates one example set of relative power intensities within the 430-470 nm wavelength range relative to the 540-575 nm, 585-615 nm, and 620-650 nm wavelength ranges using a low value (mW) and a high value (mW) at each end of the respective range (nm):

CHART 1

| Range (nm) | Low (mW) | High (mW) | Low Relative Power Intensity | High Relative Power Intensity |
|---|---|---|---|---|
| 430-470 | 245 | 546 | — | — |
| 540-575 | 983 | 1,200 | 4.012 | 2.198 |
| 585-615 | 1,210 | 1,260 | 4.939 | 2.308 |
| 620-650 | 770 | 1,170 | 3.143 | 2.143 |

For example, the spectral power table 86 illustrated in FIG. 15 shows that the 430 nm wavelength may have a power intensity of 245 mW. Moreover, the same spectral power table 86 illustrated in FIG. 15 shows that the 470 nm wavelength may have a power intensity of 546 mW. Similarly, the spectral power table 86 illustrated in FIG. 15 shows that the 540 nm wavelength may have a power intensity of 983 mW, the 575 nm wavelength may have a power intensity of 1,200 mW, the 585 nm wavelength may have a power intensity of 1,260 mW, the 615 nm wavelength may have a power intensity of 1,210 mW, the 620 nm wavelength may have a power intensity of 1,170 mW, and the 650 nm wavelength may have a power intensity of 770 mW. Accordingly, the low relative power intensities and the high relative power intensities within the 540-575 nm, 585-615 nm, and 620-650 nm wavelength ranges can be calculated relative to the aforementioned 430-470 nm wavelength range by using these values.

Specifically, in one example, the power intensity within the 540-575 nm wavelength range may be on the order of about 2.198× to 4.012× higher than that of the 430-470 nm wavelength range. This is calculated by way of dividing the power intensity at the 540 nm wavelength (i.e., 983 mW) by the power intensity at the 430 nm wavelength (i.e., 245 nm) to arrive at a ratio of about 4.012×, or about 4.0×. Moreover, dividing the power intensity at the 575 nm wavelength (i.e., 1,200 mW) by the power intensity at the 470 nm wavelength (i.e., 546 nm) arrives at a ratio of about 2.198, or about 2.2×. Accordingly, the power intensity within the 540-575 nm wavelength range is approximately 2.2× to 4.0× higher than the power intensity within the 430-470 nm wavelength range.

In another example, the power intensity within the 585-615 nm wavelength range may be on the order of about 2.308× to 4.939× higher than the 430-470 nm wavelength range. This is calculated by way of dividing the power intensity at the 615 nm wavelength (i.e., 1,210 mW) by the power intensity at the 430 nm wavelength (i.e., 245 nm) to arrive at a ratio of about 4.939×, or about 4.9×. Moreover, dividing the power intensity at the 585 nm wavelength (i.e., 1,260 mW) by the power intensity at the 470 nm wavelength (i.e., 546 nm) arrives at a ratio of about 2.308, or about 2.3×. Accordingly, the power intensity within the 585-615 nm wavelength range is approximately 2.3× to 4.9× higher than the power intensity within the 430-470 nm wavelength range.

In a third example, the power intensity within the 620-650 nm wavelength range may be about 2.143× to 3.143× higher than that of the 430-470 nm wavelength range. This is calculated by way of dividing the power intensity at the 650 nm wavelength (i.e., 770 mW) by the power intensity at the 430 nm wavelength (i.e., 245 nm) to arrive at a ratio of about 3.143×, or about 3.14×. Moreover, dividing the power intensity at the 620 nm wavelength (i.e., 1,170 mW) by the power intensity at the 470 nm wavelength (i.e., 546 nm) arrives at a ratio of about 2.143, or about 2.14×. Accordingly, the power intensity within the 620-650 nm wavelength range is approximately 2.14× to 3.14× higher than the power intensity within the 430-470 nm wavelength range.

In another example, the spectral power table 86 illustrated in FIG. 15 can be used to determine the average relative power intensities within certain wavelength ranges. For example, Chart 2 illustrates one example set of average power intensities within the 430-470 wavelength range relative to the 540-575 nm, 585-615 nm, and 620-650 nm wavelength ranges.

CHART 2

| Range (nm) | Average Power Intensity | Average Ratio |
| --- | --- | --- |
| 430-470 | 711 mW | — |
| 540-575 | 1,089 mW | 1.532 |
| 585-615 | 1,269 mW | 1.785 |
| 620-650 | 1,014 mW | 1.426 |

Within the 430-470 nm wavelength range, the spectral power table 86 illustrates that the 430 nm wavelength may have a power intensity of 245 mW, the 435 nm wavelength may have a power intensity of 369 mW, the 440 nm wavelength may have a power intensity of 538 mW, the 445 nm wavelength may have a power intensity of 813 mW, the 450 nm wavelength may have a power intensity of 1,160 mW, the 455 nm wavelength may have a power intensity of 1,180 mW, the 460 nm wavelength may have a power intensity of 874 mW, the 465 nm wavelength may have a power intensity of 674 mW, and the 470 nm wavelength may have a power intensity of 546 mW. Accordingly, the average power intensity within the 430-470 nm wavelength range can be calculated by aggregating each power intensity within the 430-470 nm wavelength range (i.e., 245 mW+369 mW+538 mW+813 mW+1,160 mW+1,180 mW+874 mW+674 mW+546 mW=6,399 mW) and dividing by the number of discrete wavelengths measured within the range (i.e., 9), which equals 711 mW (i.e., 6,399 mW/9).

Within the 540-575 nm wavelength range, the 540 nm wavelength may have a power intensity of 983 mW, the 545 nm wavelength may have a power intensity of 1,010 mW, the 550 nm wavelength may have a power intensity of 1,040 mW, the 555 nm wavelength may have a power intensity of 1,070 mW, the 560 nm wavelength may have a power intensity of 1,100 mW, the 565 nm wavelength may have a power intensity of 1,140 mW, the 570 nm wavelength may have a power intensity of 1,170 mW, and the 575 nm wavelength may have a power intensity of 1,200 mW. Accordingly, the average power intensity within the 540-575 nm wavelength range can be calculated by aggregating each power intensity within the 540-575 nm wavelength range (i.e., 983 mW+1,010 mW+1,040 mW+1,070 mW+1,100 mW+1,140 mW+1,170 mW+1,200 mW=8,713 mW) and dividing by the number of discrete wavelengths measured within the range (i.e., 8), which equals 1,089 mW (i.e., 8,713 mW/8).

Within the 585-615 nm wavelength range, the 585 nm wavelength may have a power intensity of 1,260 mW, the 590 nm wavelength may have a power intensity of 1,280 mW, the 595 nm wavelength may have a power intensity of 1,290 mW, the 600 nm wavelength may have a power intensity of 1,300 mW, the 605 nm wavelength may have a power intensity of 1,290 mW, the 610 nm wavelength may have a power intensity of 1,250 mW, and the 615 nm wavelength may have a power intensity of 1,210 mW. Accordingly, the average power intensity within the 585-615 nm wavelength range can be calculated by aggregating each power intensity within the 585-615 nm wavelength range (i.e., 1,260 mW+1,280 mW+1,290 mW+1,300 mW+1,290 mW+1,250 mW+1,210 mW=8,880 mW) and dividing by the number of discrete wavelengths measured within the range (i.e., 7), which equals 1,269 mW (i.e., 8,880 mW/7).

Within the 620-650 nm wavelength range, the 620 nm wavelength may have a power intensity of 1,170 mW, the 625 nm wavelength may have a power intensity of 1,130 mW, the 630 nm wavelength may have a power intensity of 1,090 mW, the 635 nm wavelength may have a power intensity of 1,060 mW, the 640 nm wavelength may have a power intensity of 1,000 mW, the 645 nm wavelength may have a power intensity of 881 mW, and the 650 nm wavelength may have a power intensity of 770 mW. Accordingly, the average power intensity within the 620-650 nm wavelength range can be calculated by aggregating each power intensity within the 620-650 nm wavelength range (i.e., 1,170 mW+1,130 mW+1,090 mW+1,060 mW+1,000 mW+881 mW+770 mW=7,101 mW) and dividing by the number of discrete wavelengths measured within the range (i.e., 7), which equals 1,014 mW (i.e., 7,101 mW/7).

In view thereof, the relative average power intensities within the 540-575 nm, 585-615 nm, and 620-650 nm wavelength ranges can be calculated relative to the average power intensities within the 430-470 nm wavelength range by using the values set forth in Chart 2 above.

Specifically, in one example, the relative average power intensity within the 540-575 nm wavelength range may be about 1.532× higher than that of the average power intensity within the 430-470 nm wavelength range. This is calculated by way of dividing the average power intensity within the 540-575 nm wavelength range (i.e., 1,089 mW) by the average power intensity within the 430-470 nm wavelength range (i.e., 711 nm) to arrive at a ratio of about 1.532×, or about 1.5×.

In another example, the relative average power intensity within the 585-615 nm wavelength range may be about 1.785× higher than that of the average power intensity within the 430-470 nm wavelength range. This is calculated by way of dividing the average power intensity within the 585-615 nm wavelength range (i.e., 1,269 mW) by the average power intensity within the 430-470 nm wavelength range (i.e., 711 nm) to arrive at a ratio of about 1.785×, or about 1.8×.

In a third example, the relative average power intensity within the 620-650 nm wavelength range may be about 1.426× higher than that of the average power intensity within the 430-470 nm wavelength range. This is calculated by way of dividing the average power intensity within the 620-650 nm wavelength range (i.e., 1,014 mW) by the average power intensity within the 430-470 nm wavelength range (i.e., 711 nm) to arrive at a ratio of about 1.426×, or about 1.4×.

In another example, the spectral power table 86 illustrated in FIG. 15 can be used to determine the relative power intensities between a low power output and a high power output within certain wavelength ranges. For example, Chart 3 illustrates one example set of low power and high power outputs within the 430-470 wavelength range relative to the low power and high power output within the 540-575 nm, 585-615 nm, and 620-650 nm wavelength ranges.

approximately the same as to 4.0× higher than the low power output and the high power output of the 430-470 nm wavelength range. The low power output ratio is calculated by dividing the low power output within the 540-575 nm wavelength range (i.e., 983 mW) by the low power output within the 430-470 nm wavelength range (i.e., 245 mW) to arrive at approximately 4.0× (i.e., 983 mW/245 mW=4.012). Similarly, the high power output ratio is calculated by dividing the high power output within the 540-575 nm wavelength range (i.e., 1,200 mW) by the high power output within the 430-470 nm wavelength range (i.e., 1,180 mW) to arrive at approximately 1.0× (i.e., 1,200 mW/1,180 mW=1.017).

Moreover, the 585-615 nm wavelength range may have a low power output and a high power output approximately 1.1×-4.9× higher than the low power output and the high power output of the 430-470 nm wavelength range. The low power output ratio is calculated by dividing the low power output within the 585-615 nm wavelength range (i.e., 1,210 mW) by the low power output within the 430-470 nm wavelength range (i.e., 245 mW) to arrive at approximately 4.9× (i.e., 1,210 mW/245 mW=4.939). Similarly, the high power output ratio is calculated by dividing the high power output within the 585-615 nm wavelength range (i.e., 1,300 mW) by the high power output within the 430-470 nm wavelength range (i.e., 1,180 mW) to arrive at approximately 1.1× (i.e., 1,300 mW/1,180 mW=1.102).

Lastly, the 620-650 nm wavelength range may have a low power output and a high power output approximately the same as or 3.1× higher than the low power output and the high power output of the 430-470 nm wavelength range. The low power output ratio is calculated by dividing the low power output within the 620-650 nm wavelength range (i.e., 770 mW) by the low power output within the 430-470 nm wavelength range (i.e., 245 mW) to arrive at approximately 3.1× (i.e., 770 mW/245 mW=3.143). Similarly, the high power output ratio is calculated by dividing the high power output within the 620-650 nm wavelength range (i.e., 1,170 mW) by the high power output within the 430-470 nm wavelength range (i.e., 1,180 mW) to arrive at approximately 1.0× (i.e., 1,170 mW/1,180 mW=0.992).

CHART 3

| Range (nm) | Low Power Output | High Power Output | Low Ratio | High Ratio |
| --- | --- | --- | --- | --- |
| 430-470 | 245 mW @ 430 nm | 1,180 mW @ 455 nm | — | — |
| 540-575 | 983 mW @ 540 nm | 1,200 mW @ 575 nm | 4.012 | 1.017 |
| 585-615 | 1,210 mW @ 615 nm | 1,300 mW @ 600 nm | 4.939 | 1.102 |
| 620-650 | 770 mW @ 650 nm | 1,170 mW @ 620 nm | 3.143 | 0.992 |

Within the 430-470 nm wavelength range, the spectral power table 86 illustrates a low power output of 245 mW at the 430 nm wavelength and a high power output of 1,180 mW at the 455 nm wavelength; within the 540-575 nm wavelength range, the spectral power table 86 illustrates a low power output of 983 mW at the 540 nm wavelength and a high power output of 1,200 mW at the 575 nm wavelength; within the 585-615 nm wavelength range, the spectral power table 86 illustrates a low power output of 1,210 mW at the 615 nm wavelength and a high power output of 1,300 mW at the 600 nm wavelength; and within the 620-650 nm wavelength range, the spectral power table 86 illustrates a low power output of 770 mW at the 650 nm wavelength and a high power output of 1,170 mW at the 620 nm wavelength.

As Chart 3 indicates, the 540-575 nm wavelength range may have a low power output and a high power output In another embodiment, the spectral power table 86 illustrated in FIG. 15 can be used to determine the ratio of high power output to low power output within certain wavelength ranges. For example, Chart 4 illustrates one example showing the ratio of the high power output to the low power output within each of the 430-470 nm, 540-575 nm, 585-615 nm, and 620-650 nm wavelength ranges:

CHART 4

| Range (nm) | Low Power Output | High Power Output | Ratio |
| --- | --- | --- | --- |
| 430-470 | 245 mW @ 430 nm | 1,180 mW @ 455 nm | 4.816 |
| 540-575 | 983 mW @ 540 nm | 1,200 mW @ 575 nm | 1.221 |

CHART 4-continued

| Range (nm) | Low Power Output | High Power Output | Ratio |
|---|---|---|---|
| 585-615 | 1,210 mW @ 615 nm | 1,300 mW @ 600 nm | 1.074 |
| 620-650 | 770 mW @ 650 nm | 1,170 mW @ 620 nm | 1.519 |

Similar to Chart 3 above, within the 430-470 nm wavelength range, the spectral power table 86 illustrates a low power output of 245 mW at the 430 nm wavelength and a high power output of 1,180 mW at the 455 nm wavelength; within the 540-575 nm wavelength range, the spectral power table 86 illustrates a low power output of 983 mW at the 540 nm wavelength and a high power output of 1,200 mW at the 575 nm wavelength; within the 585-615 nm wavelength range, the spectral power table 86 illustrates a low power output of 1,210 mW at the 615 nm wavelength and a high power output of 1,300 mW at the 600 nm wavelength; and within the 620-650 nm wavelength range, the spectral power table 86 illustrates a low power output of 770 mW at the 650 nm wavelength and a high power output of 1,170 mW at the 620 nm wavelength.

As Chart 4 indicates, the ratio of the high power output to the low power output in the 430-470 nm wavelength range is about 4.8×. The ratio is calculated by dividing the high power output within the 430-470 nm wavelength range (i.e., 1,180 mW) by the low power output within the 430-470 nm wavelength range (i.e., 245 mW) to arrive at approximately 4.8× (i.e., 1,180 mW/245 mW=4.816). Moreover, as shown in Chart 4 above, the ratio of the high power output to the low power output in the 540-575 nm wavelength range is about 1.2×. Similarly, the ratio is calculated by dividing the high power output within the 540-575 nm wavelength range (i.e., 1,200 mW) by the low power output within the 540-575 nm wavelength range (i.e., 983 mW) to arrive at approximately 1.2× (i.e., 1,200 mW/983 mW=1.221×). Chart 4 also shows that the ratio of the high power output to the low power output in the 585-615 nm wavelength range is about 1.0×. Again, the ratio is calculated by dividing the high power output within the 585-615 nm wavelength range (i.e., 1,300 mW) by the low power output within the 585-615 nm wavelength range (i.e., 1,210 mW) to arrive at approximately 1.0× (i.e., 1,300 mW/1,210 mW=1.221×). Lastly, Chart 4 also shows that the ratio of the high power output to the low power output in the 620-650 nm wavelength range is about 1.5×. Again, the ratio is calculated by dividing the high power output within the 620-650 nm wavelength range (i.e., 1,170 mW) by the low power output within the 620-650 nm wavelength range (i.e., 770 mW) to arrive at approximately 1.5× (i.e., 1,170 mW/770 mW=1.519×).

Figure 16:
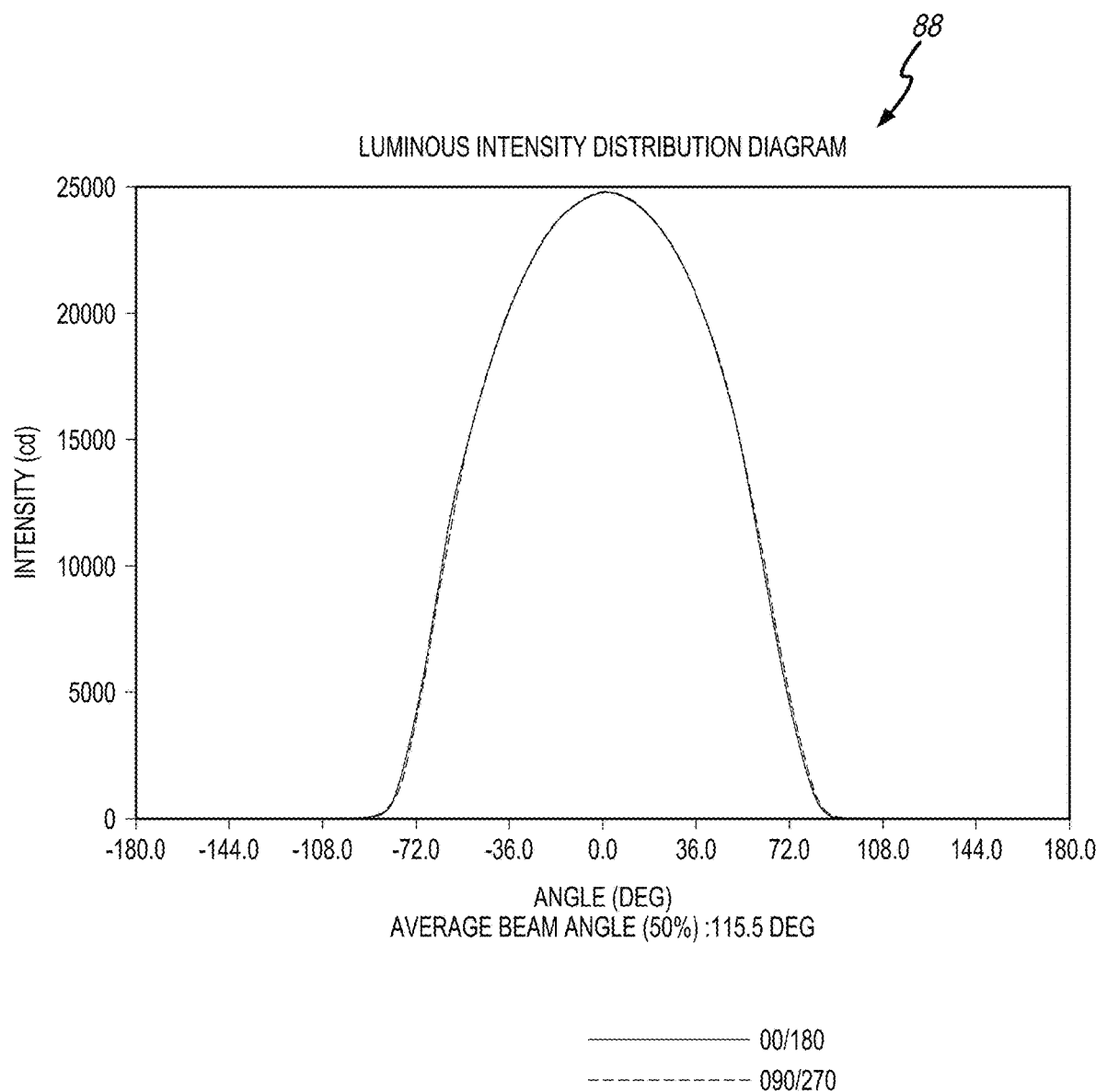
FIG. 16 is a luminous intensity distribution diagram, illustrating the light output intensity in Candela ("cd") as a function of angular beam angle.

Lastly, FIG. 16 is a luminous intensity distribution diagram 88 illustrating the angular distribution of the light output intensity in Candela ("cd") as a function of angular orientation. The distributions in the 0° to 180° direction and in the 90° and 270° directions generally overlap each other, which indicate that the distribution is circularly symmetric with a full angle at 50% intensity being approximately 115.5°. This allows a uniform light field when used with a single or multiple LED grow light systems 30 overlapping with each other, and may provide uniform light for a larger area.

Although several embodiments have been described in detail for purposes of illustration, various modifications may be made without departing from the scope and spirit of the invention. Accordingly, the invention is not to be limited, except as by the appended claims.

What is claimed is:

1. A full spectrum LED grow light system, comprising:
   at least one white LED having a first light output; and
   at least one colored LED having a second light output, the first light output and the second light output combine to comprise a continuous aggregate light output mimicking a full spectrum of sunlight having a first average power intensity within a wavelength range of about 430-470 nm, a second average power intensity within a wavelength range of about 540-575 nm relatively higher than the first average power intensity, a third average power intensity within a wavelength range of about 585-615 nm relatively higher than the first average power intensity and the second average power intensity, and a fourth average power intensity within a wavelength range of about 620-650 nm relatively higher than the first average power intensity, but relatively lower than the second average power intensity and the third average power intensity.

2. The full spectrum LED grow light system of claim 1, wherein the first average power intensity comprises is approximately 711 mW, the second average power intensity comprises approximately 1,089 mW, the third average power intensity comprises approximately 1,269 mW, and the fourth average power intensity comprises approximately 1,014 mW.

3. A full spectrum LED grow light system, comprising:
   at least one white LED having a first light output; and
   at least one colored LED having a second light output, the first light output and the second light output combine to comprise a continuous aggregate light output mimicking a full spectrum of sunlight having a first high power output within a first wavelength range of about 430-470 nm that is at least about 4.8× higher than a first low power output within the first wavelength range, a second high power output within a second wavelength range of about 540-575 nm that is at least 1.2× higher than a second low power output within the second wavelength range, a third high power output within a third wavelength range of about 585-615 nm that is at least approximately 1.0× a third low power output within the third wavelength range, and a fourth high power output within a fourth wavelength range of about 620-650 nm that is at most 1.5× higher than a fourth low power output within the fourth wavelength range.

4. The full spectrum LED grow light system of claim 3, wherein the first high power output comprises at least 1,180 mW.

5. The full spectrum LED grow light system of claim 3, wherein the second high power output comprises at most 1,200 mW.

6. The full spectrum LED grow light system of claim 3, wherein the third high power output comprises at most 1,300 mW.

7. The full spectrum LED grow light system of claim 3, wherein the fourth high power output comprises at most 1,170 mW.

8. The full spectrum LED grow light system of claim 3, wherein the first high power output is emitted in approximately a 455 nm wavelength.

9. The full spectrum LED grow light system of claim 3, wherein the second high power output is emitted in approximately a 575 nm wavelength.

10. The full spectrum LED grow light system of claim 3, wherein the third high power output is emitted in approximately a 600 nm wavelength.

11. The full spectrum LED grow light system of claim 3, wherein the fourth high power output is emitted in approximately a 620 nm wavelength.

12. The full spectrum LED grow light system of claim 3, wherein the first low power output comprises at most 245 mW.

13. The full spectrum LED grow light system of claim 3, wherein the second low power output comprises at most 983 mW.

14. The full spectrum LED grow light system of claim 3, wherein the third low power output comprises at most 1,210 mW.

15. The full spectrum LED grow light system of claim 3, wherein the fourth low power output comprises at least 770 mW.

16. The full spectrum LED grow light system of claim 3, wherein the first low power output is emitted in approximately a 430 nm wavelength.

17. The full spectrum LED grow light system of claim 3, wherein the second low power output is emitted in approximately a 540 nm wavelength.

18. The full spectrum LED grow light system of claim 3, wherein the third low power output is emitted in approximately a 615 nm wavelength.

19. The full spectrum LED grow light system of claim 3, wherein the fourth low power output is emitted in approximately a 650 nm wavelength.

20. A full spectrum LED grow light system, comprising:
    at least one white LED having a first light output; and
    at least one colored LED having a second light output, the first light output and the second light output combine to comprise a continuous aggregate light output mimicking a full spectrum of sunlight having a first peak power output of at least 1,180 mW within a first wavelength range of about 430-470 nm, a second peak power output of at most 1,200 mW within a second wavelength range of about 540-575 nm, a third peak power output of at most 1,300 mW within a third wavelength range of about 585-615 nm, and a fourth peak power output of at most 1,170 mW within a fourth wavelength range of about 620-650 nm.

21. The full spectrum LED grow light system of claim 20, wherein the first peak power output is emitted in approximately a 455 nm wavelength.

22. The full spectrum LED grow light system of claim 20, wherein the second peak power output is emitted in approximately a 575 nm wavelength.

23. The full spectrum LED grow light system of claim 20, wherein the third peak power output is emitted in approximately a 600 nm wavelength.

24. The full spectrum LED grow light system of claim 20, wherein the fourth peak power output is emitted in approximately a 620 nm wavelength.

25. The full spectrum LED grow light system of claim 20, wherein a first off peak power output within a wavelength range of about 390-425 nm is relatively lower than the first peak power output within the first wavelength range of about 430-470 nm.

26. The full spectrum LED grow light system of claim 20, wherein a second off peak power output within a wavelength range of about 475-535 nm is relatively lower than the first peak power output within the first wavelength range of about 430-470 nm and relatively lower than the second peak power output within the second wavelength range of about 540-575 nm.

27. The full spectrum LED grow light system of claim 20, wherein a third off peak power output within a wavelength of about 580 nm is relatively lower than the second peak power output within the second wavelength range of about 540-575 nm and relatively lower than the third peak power output within the third wavelength range of about 585-615 nm.

28. A full spectrum LED grow light system, comprising:
    at least one white LED having a first light output; and
    at least one colored LED having a second light output, the first light output and the second light output combine to comprise a continuous aggregate light output mimicking a full spectrum of sunlight comprising a first wavelength range of about 430-470 nm having a first peak intensity in about a 450-455 nm wavelength range, a second wavelength range of about 540-575 nm having a second peak intensity at or below 1,200 mW, a third wavelength range of about 585-615 nm having a third peak intensity at or below 1,300 mW, and a fourth wavelength range of about 620-650 nm having a fourth peak intensity in about a 620-625 nm wavelength.

29. The full spectrum LED grow light system of claim 28, wherein the first peak intensity comprises at least 1,180 mW and the fourth peak intensity comprises at most 1,170 mW.

30. The full spectrum LED grow light system of claim 28, wherein a standard deviation of power intensities within the fourth wavelength range of about 620-650 comprises 143 nm or less.

* * * * *